United States Patent [19]
Yoshida et al.

[11] Patent Number: 6,078,680
[45] Date of Patent: *Jun. 20, 2000

[54] METHOD, APPARATUS, AND STORAGE MEDIUM FOR DETECTION OF NODULES IN BIOLOGICAL TISSUE USING WAVELET SNAKES TO CHARACTERIZE FEATURES IN RADIOGRAPHIC IMAGES

[75] Inventors: Hiroyuki Yoshida; Shigehiko Katsuragawa; Yali Amit, all of Chicago; Kunio Doi, Willowbrook, all of Ill.

[73] Assignee: Arch Development Corporation, Chicago, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/900,191

[22] Filed: Jul. 25, 1997

[51] Int. Cl.[7] ............................................. G06K 9/00
[52] U.S. Cl. ........................ 382/128; 382/199; 382/224; 382/266
[58] Field of Search ......................... 382/132, 128, 382/199, 266, 260, 130, 263, 242, 209, 215, 217, 224, 225, 243, 286, 291, 294, 295, 203, 195, 261; 345/435, 441, 442

[56] References Cited

U.S. PATENT DOCUMENTS

| | | | |
|---|---|---|---|
| 3,882,304 | 5/1975 | Walters | 235/151.11 |
| 4,839,807 | 6/1989 | Doi et al. | 364/413.13 |
| 4,851,984 | 7/1989 | Doi et al. | 364/413.23 |
| 4,907,156 | 3/1990 | Doi et al. | 364/413.13 |
| 5,289,374 | 2/1994 | Doi et al. | 364/413.13 |
| 5,319,549 | 6/1994 | Katsuragawa et al. | 364/413.13 |
| 5,359,513 | 10/1994 | Kano et al. | 364/413.23 |
| 5,463,548 | 10/1995 | Asada et al. | 364/413.02 |
| 5,487,116 | 1/1996 | Nakano et al. | 382/104 |
| 5,579,444 | 11/1996 | Dalziel et al. | 395/94 |
| 5,598,481 | 1/1997 | Nishikawa et al. | 382/132 |
| 5,622,171 | 4/1997 | Asada et al. | 364/413.13 |
| 5,627,907 | 5/1997 | Gur et al. | 382/132 |
| 5,638,458 | 6/1997 | Giger et al. | 382/133 |
| 5,666,434 | 9/1997 | Nishikawa et al. | 382/128 |
| 5,668,888 | 9/1997 | Doi et al. | 382/132 |
| 5,733,721 | 3/1998 | Hemstreet, III et al. | 382/36 |
| 5,768,413 | 6/1998 | Levin et al. | 382/131 |
| 5,790,690 | 8/1998 | Doi et al. | 382/128 |
| 5,799,100 | 8/1998 | Clarke et al. | 382/132 |

OTHER PUBLICATIONS

Setarehdan et al., "Fully Automatic Left Ventricular Myocardial Boundary Detection in Echocardiographic Images: A Comparison of Two Modern Methods", 1996, pp. 5/1–5/6, IEE.

Therrien, "Decision Estimation and Classification", 1989, pp. 30–35.

Fok et al., "Automated Analysis of Nerve–Cell Images Using Active Contour Models", Jun. 1996, pp. 353–368, IEEE Transactions on Medical Imaging, vol. 15, No. 3.

Chuang et al., "Cartoon Animation and Morphing by Using the Wavelet Curve Descriptor", 1994, pp. 666–670.

(List continued on next page.)

*Primary Examiner*—Amelia Au
*Assistant Examiner*—Timothy M. Johnson
*Attorney, Agent, or Firm*—Oblon, Spivak, McClelland, Maier & Neustadt, P.C.

[57] ABSTRACT

A method and apparatus for discrimination of nodules and false positives in digital chest radiographs, using a wavelet snake technique. The wavelet snake is a deformable contour designed to identify the boundary of a relatively round object. The shape of the snake is determined by a set of wavelet coefficients in a certain range of scales. Portions of the boundary of a nodule are first extracted using a multiscale edge representation. The multiscale edges are then fitted by a gradient descent procedure which deforms the shape of a wavelet snake by changing its wavelet coefficients. The degree of overlap between the fitted snake and the multiscale edges is calculated and used as a fit quality indicator for discrimination of nodules and false detections.

40 Claims, 23 Drawing Sheets

OTHER PUBLICATIONS

Mallat et al., "Characterization of signals from multiscale edges", Jul. 1992, pp. 710–732, IEEE Transactions on Pattern Analysis and Machine Intelligence, vol. 14, No. 7.

Mallat et al., "Singularity detection and processing with wavelets", Mar. 1992, pp. 617–643, IEEE Transactions on Information Theory, vol. 38, No. 2.

Yoshida et al., "Computer–Aided Diagnosis of Pulmonary Nodules in Chest Radiographs: A Wavelet–Based Snake Approach", 1998, pp. 258–263.

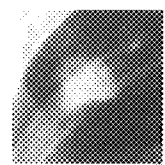
FIGURE 1(a)
 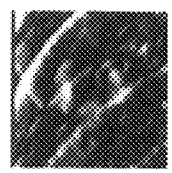 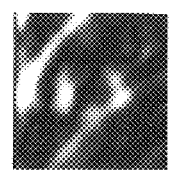 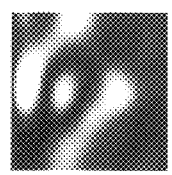
FIGURE 1(b)   FIGURE 1(c)   FIGURE 1(d)   FIGURE 1(e)
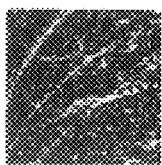   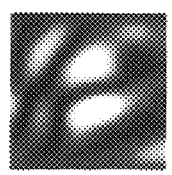
FIGURE 1(f)   FIGURE 1(g)   FIGURE 1(h)   FIGURE 1(i)

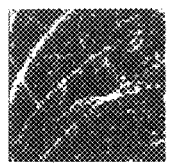 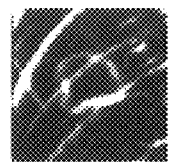 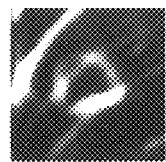 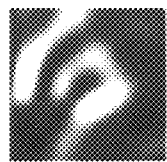
FIGURE 2(a)　　FIGURE 2(b)　　FIGURE 2(c)　　FIGURE 2(d)
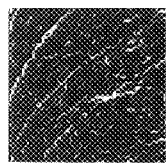 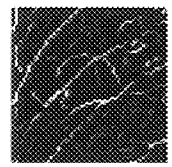 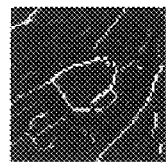 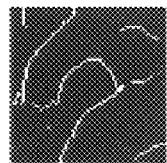
FIGURE 2(e)　　FIGURE 2(f)　　FIGURE 2(g)　　FIGURE 2(h)
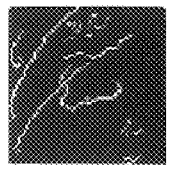 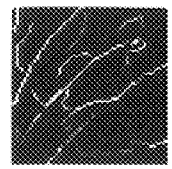 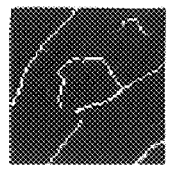 
FIGURE 2(i)　　FIGURE 2(j)　　FIGURE 2(k)　　FIGURE 2(l)

4,078,680

METHOD, APPARATUS, AND STORAGE MEDIUM FOR DETECTION OF NODULES IN BIOLOGICAL TISSUE USING WAVELET SNAKES TO CHARACTERIZE FEATURES IN RADIOGRAPHIC IMAGES

The present invention was made in part with U.S. Government Support Under grant numbers USPHS CA 62625, CA 60187, and CA 64370 (National Cancer Institute, National Institutes of Health, and Department of Health and Human Services, as well as MRH DAMD 17-93-J-3021 and MRH DAMD 71-96-1-6228 (U.S. Army, Department of Defense). The U.S. Government has certain rights in the invention.

BACKGROUND OF THE INVENTION

1. Field of the Invention

The invention relates to characterization of features in images of biological tissue, particularly to detection of pulmonary nodules in chest radiographs, and relates to CAD techniques for automated detection of abnormalities in chest images.

The present invention also generally relates to CAD techniques for automated detection of abnormalities in digital images, for example as disclosed in one or more of U.S. Pat. Nos. 4,839,807; 4,841,555; 4,851,984; 4,875,165; 4,907,156; 4,918,534; 5,072,384; 5,133,020; 5,150,292; 5,224,177; 5,289,374; 5,319,549; 5,343,390; 5,359,513; 5,452,367; 5,463,548; 5,491,627; 5,537,485; 5,598,481; 5,622,171; 5,638,458; 5,657,362; 5,666,434; 5,668,888; 5,673,332; 5,740,268; 5,790,690; 5,832,103; 5,873,824; and 5,881,124; as well as U.S. patent application Ser. Nos. 08/158,388; 08/173,935; 08/523,210; 08/562,087; 08/757,611; 08/900,191; 08/900,188; 08/900,192; 08/900,189 and 08/398,307 which has been abandoned in favor of U.S. continuation patent application Ser. No. 08/982,282. The present invention includes use of various technologies referenced and described therein, as well as described in the references identified in the appended APPENDIX and cross-referenced throughout the specification be reference to the number, in brackets, of the respective reference listed in the APPENDIX, the entire contents of which, including the related patents and applications listed above and references listed in the APPENDIX, are incorporated herein by reference.

2. Discussion of the Related Art

Certain diseases, e.g., cancer, can form nodules (i.e., abnormal, often rounded growths) in body tissues. Detection of nodules (which can be, e.g., malignant or benign tumors) can be of great importance for diagnosis of disease, particularly lung cancer. Although X-radiographs (i.e., x-ray images) have, in some cases, proven successful in detecting the nodules, studies have shown that radiologists attempting to diagnose lung disease by visual examination of chest radiographs can fail to detect pulmonary (i.e., lung) nodules in up to 30% of actually abnormal cases (i.e., cases in which nodules are actually present). [1] [2] To improve the accuracy of diagnoses, computer-aided diagnosis (CAD) of X-radiographs has been developed by the inventors and others at the Department of Radiology at the University of Chicago, and utilized in conjunction with visual examination of the X-ray images. [3] [4] [5] The output of the computer alerts the radiologist to potential nodule locations, and the final diagnostic decision is then made by the radiologist. The feasibility of CAD to improve the performance of radiologists has been demonstrated in the detection of pulmonary nodules. [6]

However, conventional techniques for computerized detection of pulmonary nodules suffer from detection of "false positives" (i.e., spurious detection of nodules that do not actually exist). In conventional systems, reduced rates of false positive detection cannot typically be achieved without reducing the sensitivity of detection of actual nodules. Consequently, operating a conventional system at a sensitivity sufficiently high for clinical use (i.e., practical medical use) has the drawback that the number of false positives can be undesirably high. In fact, some conventional systems, if operated at acceptably high sensitivity, can produce from 5 to 10 false positives per image.

Therefore, there is a need for an apparatus and method which can maintain a high sensitivity of detection of actual nodules in biological tissue, while reducing the rate of spurious detection. In particular, increased accuracy of pulmonary nodule detection is important for correct diagnosis of lung disease.

SUMMARY OF THE INVENTION

Accordingly, it is an object of the invention to provide an apparatus and method which can detect nodules, particularly pulmonary nodules, with high sensitivity while minimizing the number of false positive detections.

Another object of this invention is to provide a novel CAD technique for the detection of anatomical abnormalities, such as pulmonary nodules, in digital chest radiographs, and in particular, a novel method and apparatus for classifying a selected feature in an original image as a nodule or as a false positive detection.

A further object of this invention is to provide a novel machine readable medium storing a program for performing the steps of the method of the invention.

The above and other objects are achieved according to the present invention by providing a new and improved method for classifying a selected feature in an original image, including a) detecting at least one edge and typically plural edges of the selected feature; b) providing a deformable contour in relation to said selected feature; c) deforming said deformable contour in relation to said at least one edge; d) determining a quality of matching between said deformable contour and said at least one edge; and e) classifying said selected feature into at least one category based on the quality of matching determined in step d). Preferably, steps c) and d) are iteratively repeated until step d) indicates no further improvement in said quality of matching, whereupon step e) of classifying is based on a maximum quality of matching determined in step d).

In determining the quality of matching, the present invention includes calculating a cost function to measure the quality of matching. The cost function has a minimum or a maximum under a condition in which an amount of overlap between the deformable contour and the at least one edge is maximized. The method then preferably identifies the selected feature as one of a true nodule and a false positive, depending upon whether a value of the cost function is above a cost function threshold value.

Preferably, in detecting the edges of the selected feature, a wavelet filter having a filter scale is provided, and the original image is filtered using the wavelet filter thereby to accentuate the selected feature. A deformable contour in the form of a closed wavelet snake is provided, a wavelet transform is used to calculate a shape of the deformable contour, and the selected feature is identified as one of a true nodule and a false positive, preferably depending upon whether a value of the cost function is above a cost function threshold value.

According to a further aspect of the present invention, the original image is first filtered using a first wavelet filter having a first filter scale to produce a first filtered image in which the edges of the selected feature are accentuated, a second wavelet filter having a second filter scale is then used to filter the original image to produce a second filtered image in which the edges of the selected feature is accentuated. A first deformable contour is then iteratively deformed in relation to the detected edges of the first filtered image until the quality of matching between the first deformable contour and the edges of the selected feature in the first filtered image ceases to improve in order to determine a first maximum quality of matching. Then, a second deformable contour is iteratively deformed in relation to the detected edges of the second filtered image until the quality of matching between the second deformable contour and the detected edges in the second filtered image ceases to improve in order to determine a second maximum quality of matching. The first maximum quality of matching is then compared to the second maximum quality of matching and one of said first maximum quality of matching and said second maximum quality of matching is selected for classification in step e).

According to a further aspect of the present invention, deforming of the deformable contour includes constraining a smoothness of the snake according to at least one of a minimum smoothness limit and a maximum smoothness limit.

The method of the invention is employed in a CAD technique based on an initial linear filtering process, followed by feature extraction and classification processes. [3] [4] [7] [8] The filtering process, utilizing a difference imaging technique, is used for initial enhancement of nodule-like patterns in chest radiographs. Feature extraction is then applied to obtain morphological features such as circularity, irregularity, and size of candidate patterns based on a region growing technique. Rule-based tests and artificial neural networks (ANNs) are employed for elimination of false positives in the final classification processes for obtaining detected nodules. Then based on the wavelet snake, nodules and false positives reported by the CAD scheme are classified.

The wavelet snake employs a model-based approach that attempts to find the closed boundary of a smooth circular object in an image. In chest radiographs, nodules appear as round objects overlapped with normal structures such as blood vessels and ribs which appear as elongated, line-like objects. Therefore, according to the present invention, round objects are separate from elongated objects by the wavelet snake to identify nodules embedded in the background.

According to the invention, multiscale edge representation of a nodule is used to extract portions of the boundary of the nodule. This is accomplished by detecting edges of a a nodule by constructing curved line segments from a filtered gradient image. To that end, the method of the invention includes selecting a set of local brightness maxima along a plurality of trajectories across the gradient image and selecting a set of initial edge points based on the local brightness maxima, linking adjacent edge points to form a set of curved line segments, each having a particular number of points and a particular value of average brightness, and selecting the longest and brightest line segments as a set of edge segments which approximate a border (i.e., a perimeter) of a feature such as a nodule. This preprocessing also has the effect of eliminating local, small intensity variations due to noise inside the nodule, which may disturb the snake in estimating the boundary of the nodule. The extracted edges are then used to "guide" the deformation of the snake to estimate the entire boundary of the nodule. Then, according to the present invention, the wavelet transform is used for modification of the shape of the snake. Therefore, a smooth snake is obtained at any stage of deformation by restricting the range of the scales of the wavelet coefficients that define the shape of the wavelet snake. Using a fast wavelet transform, a fast deformation of the snake can be performed. Finally the degree of overlap between the snake and the multiscale edges is used as a measure for classification of nodules and false positives.

The invention provides improved detection of rounded features (e.g., pulmonary nodules) in radiographic images (i.e., radiographs of biological tissue) and, in addition, provides improved rejection of false positives. Consequently, more accurate and reliable diagnosis of disease, particulary pulmonary disease, is possible.

According to a further aspect of the present invention, there is provided a new and improved image processing apparatus configured to perform the steps of the method of the invention, and a storage medium storing a program for performing the steps of the method of the present invention.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawing, wherein:

FIG. 1(a) is an illustrations in a chest radiograph of a region of interest (ROI) containing a nodule at the center thereof, FIGS. 1(b)–1(e) are illustrations of x-directional wavelet coefficients in the ROI of FIG. 1(a) at scales j=1–4;

FIGS. 1(f)–1(i) are illustrations of y-directional wavelet coefficients in the ROI of FIG. 1(a) at scales j=1–4;

FIGS. 2(a)–2(d) are illustrations representing magnitudes of wavelet coefficients of an ROI of a chest radiograph displaying a nodule in the center portion of the ROI;

FIGS. 2(e)–2(h) are illustrations of edge representations at scales 1–4 of the ROI of FIGS. 2(a)–2(d);

FIGS. 2(i)–2(l) are illustrations of multiscale edge representations of the ROI of FIGS. 2(a)–2(h), which are obtained by removal of edges shorter than 10 pixels from the edge representations of FIGS. 2(e)–2(h), respectively;

DETAILED DESCRIPTION OF THE PREFERRED EMBODIMENTS

Overview

According to the present invention, a computer-aided diagnosis (CAD) procedure is utilized for the detection of pulmonary nodules in digital chest radiographs. Data produced by the CAD procedure can be used to alert a radiologist to potential nodule locations, whereupon a final diagnostic decision can be made by the radiologist. The CAD technique of the invention can help radiologists to improve their performance in the detection of pulmonary nodules. The present invention utilizes multiscale edge representation obtained by the wavelet transformation in conjunction with CAD.

In particular, edges at multiple scales, called multiscale edge representation, are employed as a preprocessing step for extraction of portions of the boundary of a nodule. Multiscale edges are utilized because they provide compact representation of various structures in chest radiographs. Features such as length and intensity of the edges, as well as scales of the image from which the edges are extracted, and characterize these structures effectively. For example, multiscale edges with very short lengths and low intensities may be caused by background noise, whereas longer edges at intermediate scales with higher intensities may correspond to the boundary of a nodule. Long edges at large scales may represent large background structures such as blood vessels and ribs. Once detected, detected edges are subjected to a wavelet snake fitting procedure and classified as a nodule or a false positive.

Exemplary CAD Technique

Figure 18:
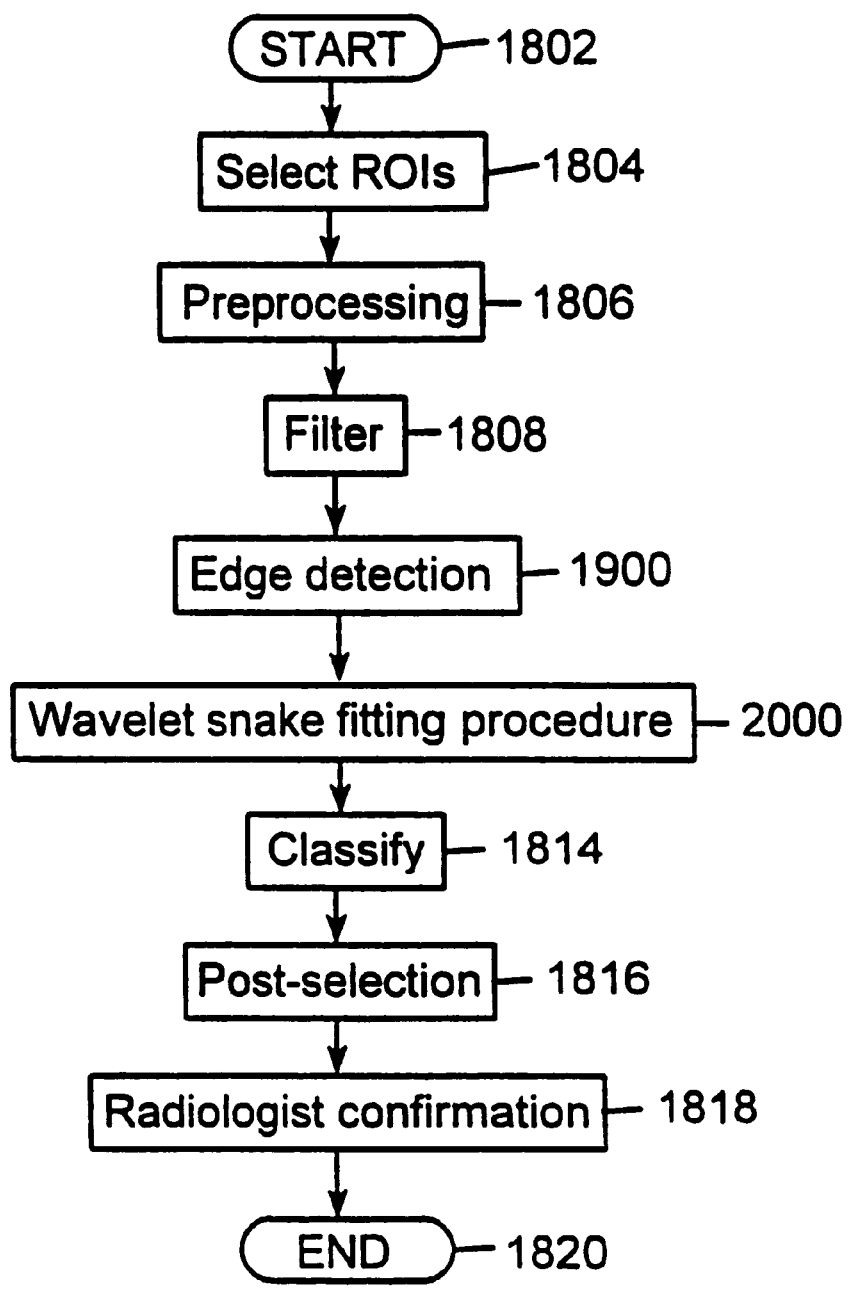
FIG. 18 is a flow chart of an exemplary feature characterization procedure according to the invention.

Referring now to the drawings, in which like reference numerals designate identical or corresponding parts throughout the several views, an exemplary CAD procedure in accordance with the invention is illustrated in FIG. 18. Upon starting the procedure (step 1802), a set of ROIs are selected (1804). The CAD procedure can, optionally, include a preprocessing step (1806) which can include, e.g., conventional image-enhancing or filtering techniques. An example of such a preprocessing step can utilize a "difference-image" technique, in which two different filters are applied independently to a particular ROI. The first filter is designed to enhance features of interest (e.g., nodules), whereas the second filter is designed to attenuate the features which are enhanced by the first filter. By subtracting the data produced by the second filter from the data produced by the first filter, features which are not of interest can be cancelled or attenuated, thereby making it easier to detect the features of interest. Difference-image techniques can be particularly useful for the initial enhancement of nodule-like patterns in chest radiographs.

After the preprocessing (1806) has been completed, the procedure of FIG. 18 continues to a spatial filtering step (1808) in order to further enhance the features of interest. The filtering step 1808 can be similar to or different from the preprocessing step 1806, and can utilize a "wavelet filter" which will be described in further detail hereinafter.

Figure 19:
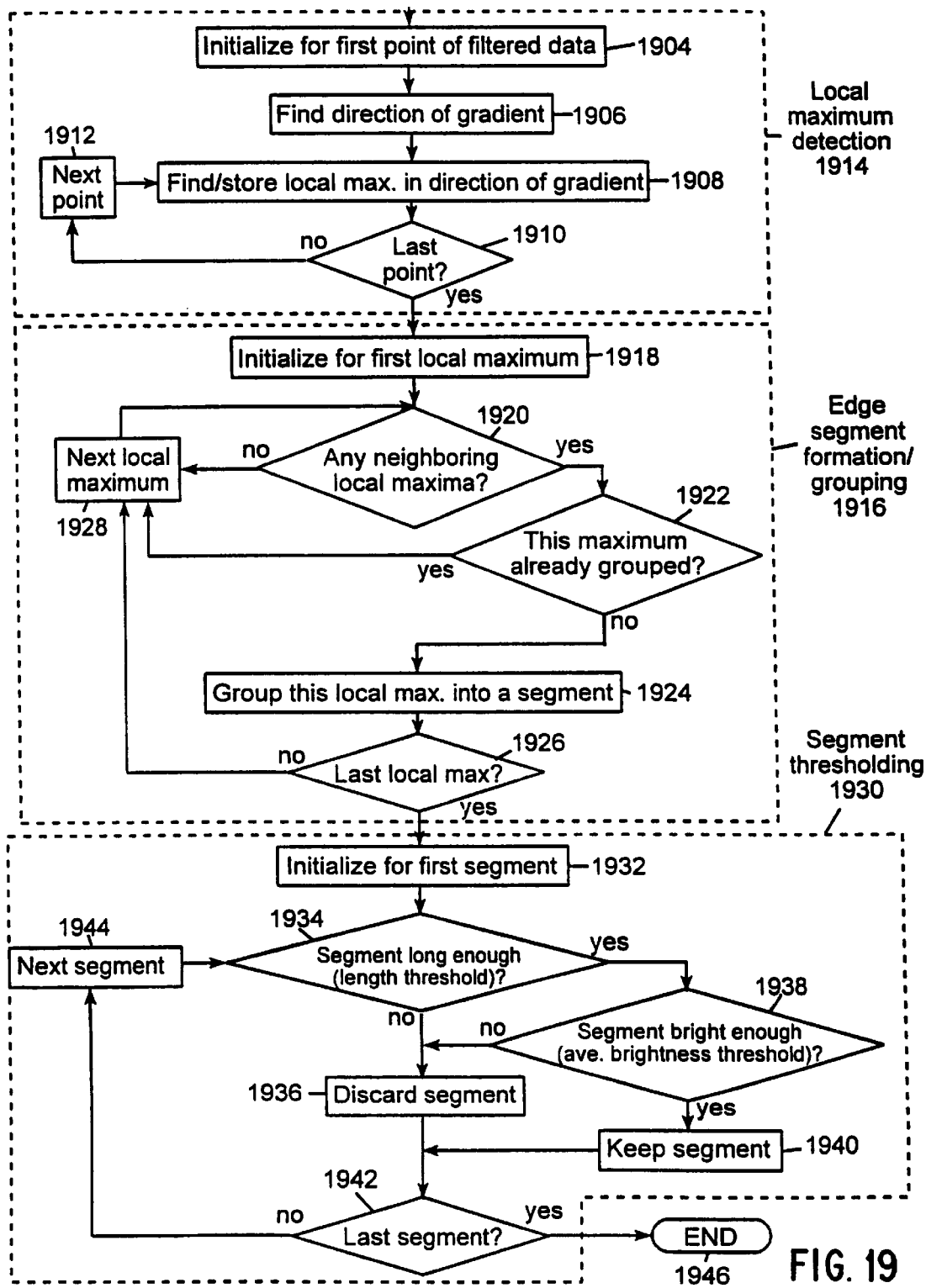
FIG. 19 is a flow chart of an exemplary edge detection procedure according to the invention.

Once the original image has been sufficiently filtered and/or enhanced, an edge detection procedure 1900, discussed hereinafter in relation to FIG. 19, is utilized to detect edges of various features of the ROI. The edges are then modeled using a "wavelet snake" fitting procedure 2000, discussed hereinafter in relation to FIG. 20, which attempts to match a closed, deformable loop to the detected edges, as will be described later in further detail. The fitting procedure can provide an indication of the shape of a particular feature of interest. Based on the results of the wavelet snake fitting procedure 2000, step 1814 classifies (i.e., categorizes) a feature of interest into one of at least two categories. For example, the feature can be identified as a nodule or a false positive.

Once a feature has been classified, a post-selection step 1816 can be utilized to provide an additional level of certainty for the detection procedure. The post-selection step 1816 can utilize conventional or nonconventional techniques. For example, rule-based tests and/or artificial neural networks (ANNs) can be utilized as additional screening procedures to improve the accuracy of discrimination of nodules from false positives.

Rule-based tests can include, but are not limited to, threshold tests which consider effective diameter, degree of circularity, and degree of irregularity of morphological features, as well as tests which consider the dependence of feature morphology upon the distribution of gray-level intervals used to characterize an image. Examples of rule-based tests are described in U.S. patent application Ser. No. 08/562,087.

ANNs utilized in the post-selection step 1816 can be "trained" to discriminate true nodules from false positives. As described in further detail in the above mentioned U.S. application (Ser. No. 08/562,087), an ANN can "learn" to recognize particular features by repeatedly receiving one or more "training sets" of examples. One or more parameters of the ANN procedure can be varied and the performance of the ANN with various parameter values can be evaluated using the training set(s). Based upon the results of the evaluation, preferred parameter values can be chosen.

Furthermore, a nodule detection procedure in accordance with the invention can, optionally, include human interaction. For example, an experienced radiologist can confirm the accuracy of the nodule detection (step 1818). When the analysis has been completed, the procedure is terminated (step 1820).

It is to be understood that, although the above-described rule-based tests, ANN techniques, and radiologist confirmation have been included in post-selection step 1816, these techniques can, in addition, be included in preprocessing step 1806.

As discussed above with reference to FIG. 18, a procedure in accordance with the invention can utilize a spatial filter (step 1808) in order to enhance certain features (i.e., cause the features to appear more prominently) and attenuate other features (i.e., cause the features to appear less prominently). In particular, the effect that the spatial filter has upon a feature can depend upon the "spatial frequencies" contained in the feature. For example, if the brightness of pixels corresponding to a particular feature is a function which varies rapidly with position across the image, the feature can be said to contain high spatial frequencies. However, if a feature causes only a gradual variation of brightness across the surface of an image, the feature can be said to contain primarily low spatial frequencies. A filter in accordance with the invention can accentuate a particular range (or set of ranges) of spatial frequencies contained in an image, while attenuating another range (or set of ranges) of spatial frequencies contained within the image. Consequently, features containing a high proportion of spatial frequencies within the accentuated range(s) become more prominent and, therefore, more easily detectable, whereas features containing a high proportion of the spatial frequencies within the attenuated range(s) become less prominent. As a result, features of interest can be enhanced with respect to extraneous features, thereby mitigating the disruptive effect that extraneous features can have on processes seeking to detect the features of interest.

Furthermore, a filter in accordance with the invention can be designed to accentuate particular shapes while attenuating other shapes. For example, a filter which accentuates rounded features having a size typical of nodules, while attenuating long, straight features such as ribs, can be particularly advantageous for detecting nodules in an ROI containing nodules which are partially obscured by sections of ribs.

A particularly advantageous filter for obtaining an edge representation of ROI features in accordance with the invention can be provided using a set of functions known as "wavelets". As described in the art [14], a function $\psi(x)$ is said to be a wavelet if and only if its Fourier transform $\Psi(\omega)$, satisfies the condition:

$$\int_{\eta}^{\infty} \frac{|\hat{\psi}(\omega)|^\theta}{\omega} = \int_{-\infty}^{\eta} \frac{|\hat{\psi}(\omega)|^\theta}{|\omega|} d\omega < +\infty.$$

The wavelets of the invention are functions which are dependent upon the vector position (i.e., the two-dimensional position) $\vec{x}=(x,y)$ across the surface of an image being processed, wherein x is the horizontal position and y is the vertical position. The image can be represented by the function $I(\vec{x})$ (i.e., intensity, or brightness, versus two-dimensional position $\vec{x}$). To filter the image, a "convolution operation" is applied to the image using a selected set of wavelet functions. The filtering procedure of the invention is described in further detail in the following example in which a "wavelet transform" with nonorthogonal cubic spline wavelets is used.

Multiscale Edge Representation

In a preferred embodiment, a multiscale edge representation obtained by the wavelet transform with nonorthogonal cubic spline wavelets is used. [14] [15] In this approach, a separable spline scaling function $\phi(\vec{x})\epsilon R$ (i.e., $\phi(x)$, which is a one-dimensional real function) at position $\vec{x}=(x,y)\epsilon R^\theta$ (i.e., $\vec{x}$, which is a two-dimensional real vector) serves as a smoothing filter. The corresponding x- and y-directional wavelets used to filter an image can be chosen to be the partial derivatives of the scaling function as follows: The image $I(\vec{x})$ of this example is a measurable, square-integrable function of a two-dimensional real vector $$\left(\text{i.e.,} \int_{-\infty}^{+\infty}\int_{-\infty}^{+\infty} |I(\vec{x})|^\theta dx dy < +\infty\right).$$

[14] This condition can be denoted as: $I(\vec{x})\epsilon L^\theta(R^\theta)$. The wavelets $\psi^1(x)$ and $\psi^2(x)$ of Equation (1) can be utilized to filter the image $I(\vec{x})$ using a wavelet transform, thereby producing "wavelet coefficients" of the image. More specifically, the wavelet coefficients at "scale" j (i.e., wavelet coefficients produced by $$\begin{pmatrix} \psi^\Theta(\vec{x}) \\ \psi^\theta(\vec{x}) \end{pmatrix} = \begin{pmatrix} \partial\phi(\vec{x})/\partial x \\ \partial\phi(\vec{x})/\partial y \end{pmatrix} \quad (1)$$

processing $I(\vec{x})$ using a wavelet transform with a filter having a scale of j) are defined as follows:

$$\begin{pmatrix} W_{\overline{\omega}}^{\ominus} I(\vec{x}) \\ W_{\overline{\omega}}^{\theta} I(\vec{x}) \end{pmatrix} \equiv \begin{pmatrix} I * \psi_{\overline{\omega}}^{\ominus}(\vec{x}) \\ I * \psi_{\overline{\omega}}^{\theta}(\vec{x}) \end{pmatrix} = \vec{\nabla}(I * \phi_{\overline{\omega}})(\vec{x}) \quad (2)$$

where $\psi_{\overline{\omega}}^{\xi}(\vec{x})$ (l=1,2) represents the wavelets at scale j with orientation x (l=1) and y (l=2), the symbol * denotes the convolution operation $f(x)*g(x) \equiv \int f(u)g(x-u)du$, and $\phi_{\overline{\omega}}(\vec{x})$ represents the scaling function at scale j, defined as follows:

$$\psi_{\overline{\omega}}^{\xi}(\vec{x}) = \psi^{\xi}(\vec{x}/2^{\overline{\omega}})/\sqrt{2^{\overline{\omega}}}, \quad \phi_{\overline{\omega}} = \phi(\vec{x}/2^{\overline{\omega}})/\sqrt{2^{\overline{\omega}}} \quad (3)$$

It is to be noted that computation of the convolution of two functions is equivalent to multiplication of the respective Fourier transforms of the two functions. Consequently, if the Fourier transform of a particular feature within $I(\vec{x})$ has similarities to the Fourier transforms of the wavelets $\psi_{\overline{\omega}}^{\xi}(\vec{x})$, the feature can appear to be enhanced within the wavelet coefficient arrays $W_{\overline{\omega}}^{\ominus}(\vec{x})$ and $W_{\overline{\omega}}^{\theta}I(\vec{x})$.

In particular, wavelet coefficients $W_{\overline{\omega}}^{\xi}I(\vec{x})$ (i.e. $W_{\overline{\omega}}^{\ominus}I(\vec{x})$ and $W_{\overline{\omega}}^{\theta}I(\vec{x})$ form two-dimensional arrays of points (i.e., pixels) within which certain types of features (e.g., nodules) can be detected more readily than would be possible using only the original image $I(\vec{x})$. As can be seen from Equation (2), the wavelet coefficients $W_{\overline{\omega}}^{\xi}I(\vec{x})$ can represent a filtered gradient image (i.e., a filtered two-dimensional array representing the gradient versus position $\vec{x}$) which corresponds to the original image $I(\vec{x})$. Each point (i.e., each $\vec{x}$ location) of the gradient array is a vector having an x-component $W_{\overline{\omega}}^{\ominus}I(\vec{x})$ and a y-component $W_{\overline{\omega}}^{\theta}I(\vec{x})$. Since the magnitude of a gradient function tends to exhibit local maxima (i.e., peaks) near the edge of a feature, edges tend to appear as bright lines in an image representing the magnitude of the gradient, which allows the edges to be more readily detected. Furthermore, by proper selection of the filtering function utilized to calculate the wavelet coefficients, edges of features of particular interest can be accentuated/enhanced (i.e., caused to appear more prominently). In particular, the filter scale j of the wavelet filter used to produce the wavelet coefficients $W_{\overline{\omega}}^{\xi}I(\vec{x})$ can determine which types of feature (in terms of size and/or shape) are enhanced.

As can be seen by examination of Equation (3), adjusting the scale j causes a change in the number by which the two-dimensional position $\vec{x}$ is divided, thereby effecting the spatial dependence of the scaling function φ and the wavelet functions ψ. More specifically, by increasing the scale j, the denominator $2^j$ of the position $\vec{x}/2^j$ is increased, thereby causing $\psi(\vec{x}/2^{\overline{\omega}})$ to change less rapidly as a function of position $\vec{x}$. In contrast, a decrease in scale j causes the wavelet functions $\psi(\vec{x}/2^{\overline{\omega}})$ to change more rapidly.

By adjusting the scale j of a filter according to the invention, an image can be processed so as to make particular features more visible and easier to detect. For example, FIG. 1(a) shows an example of an image array I($\vec{x}$) of an ROI of a chest radiograph displaying a nodule near the center of the ROI. FIGS. 1(b)–1(e) show corresponding x-directional wavelet coefficients $W_{\overline{\omega}}^{\ominus}I(\vec{x})$ at filter scales j=1 to 4, respectively. Similarly, FIGS. 1(f)–1(i) show corresponding y-directional wavelet coefficients $W_{\overline{\omega}}^{\theta}I(\vec{x})$ at filter scales j=1 to 4, respectively.

Furthermore, it is to be understood that the wavelet filter of the invention can be used as part of a difference-image technique such as the technique described earlier with reference to the preprocessing step 1806 of FIG. 18. In fact, although difference-image techniques were previously described herein with reference to the preprocessing step 1806, a difference image technique can also be utilized in conjunction with a wavelet filter as part of filtering step 1808 of FIG. 18.

According to the invention, feature edges are detected by calculating the local direction of the filtered gradient (i.e., the local direction of the vector composed of the x and y wavelet coefficients $W_j^1 I(\vec{x})$ and $W_j^2 I(\vec{x})$) at each $\vec{x}$ position and checking each of the other $\vec{x}$ points in the direction of the local gradient in order to determine whether it is a local maximum (i.e., a peak). More specifically, as shown on the right-hand side of Equation (2), the wavelet coefficients represent the gradient of $I(\vec{x})$ smoothed by $\phi(\vec{x})$ at a particular scale j. The direction of the gradient vector at a point x indicates the direction along which the image $I(\vec{x})$ has the steepest slope. Therefore, a point $\vec{x}$ can be regarded as an edge point at scale j if the magnitude of the wavelet coefficients, $$M_{\overline{\omega}} I(\vec{x}) \equiv \sqrt{|W_{\overline{\omega}}^{\ominus} I(\vec{x})|^{\theta} + |W_{\overline{\omega}}^{\theta} I(\vec{x})|^{\theta}}, \quad (4)$$

attains a local maximum along the gradient direction given by arctan $(W_{\overline{\omega}}^{\theta}I(\vec{x})/W_{\overline{\omega}}^{\ominus}(\vec{x}))$. The local maximum detection procedure can be applied to data such as, for example, the data of FIGS. 2(a)–2(d) which show the spatial dependence of the magnitude $M_{\vec{x}}(\vec{x})$ (from Equation 4) of the wavelet coefficients.

According to the invention, a set of detected local maximum points (as described above) are connected to form edge segments. For example, a selected maximum point can be connected to at least one adjacent maximum point or can be left unconnected if there are no maximum points which are adjacent or nearby to the selected one. In a preferred embodiment, each detected local maximum point is assigned to the segment to which it is first connected and, consequently, no edge crossings are generated. A set of edge segments detected within a wavelet coefficient array produced using a filter having a scale j is referred to as an "edge representation at scale j," or simply "edges at scale j," of the image $I(\vec{x})$. The notation $M_{\overline{\omega}}I(\vec{x})$ will be used herein to denote the edge representation at scale j. A set of edge representations, each having been produced from a wavelet coefficient array processed with a filter of a different scale, is referred to herein as a "multiscale edge representation."

FIGS. 2(e)–2(h) show edge representations at filter scales 1 to 4 corresponding to FIGS. 2(a)–2(d), respectively. The nodule boundary is readily extracted at scale 3, as shown in FIG. 2(g). At scales 1 and 2, the edge representations (shown in FIGS. 2(e) and 2(f)) are noisy and the boundary of the nodule is less clear than the boundary extracted at scale 3. The edge representation at scale 4 (shown in FIG. 2(h)) provides a relatively rough outline of the nodule, and a part of the nodule boundary has been merged with the edge of a rib. Since the filter scale of the edge representation affects the clarity with which nodule boundaries can be extracted, the value of the scale ultimately affects the overall performance of the feature classification procedure of the invention, as will be discussed in further detail hereinafter.

In accordance with the present invention, a multiscale edge representation is employed as a preprocessing step for extraction of edges (i.e., portions of the boundary) of a nodule. A set of multiscale edges provides a suitable representation of various structures (i.e., features) in chest radiographs, which not only makes edges easier to detect, but is also compact (i.e., the multiscale edges can be stored in, e.g., a digital memory without requiring as much memory as the entire image from which the edges have been obtained). Traits such as the length and intensity of the edges of the structures, as well as the scale of the filter used to process the image from which the edges have been extracted, are advantageously utilized to characterize the structures. For example, multiscale edges with very short lengths and low intensities can, in some cases, be caused by background noise, whereas longer edges at intermediate scales with higher intensities can correspond to the boundary of a nodule. Long edges at large scales can represent large background structures such as vessels (e.g., blood vessels) and ribs. The multiscale edge representation technique is utilized to eliminate local, small intensity variations caused by noise within the portion of the image containing a nodule. Consequently, multiscale edge representation mitigates a source of noise which could otherwise disturb procedures used to estimate the boundary (i.e., the perimeter) of the nodule.

Once the multiscale edge representation has been obtained, edge segments at individual filter scales can be "thresholded" by a chosen length and average intensity (i.e., selected according to minimum values of length and/or minimum values of average intensity) in order to remove short or low-intensity edge segments corresponding to noise in the original image. For example, FIGS. 2(i)–2(l) show multiscale edge representations obtained by removal of edges shorter than 10 pixels from the data of FIGS. 2(e)–2(h). In these examples, most of the short edges have been eliminated and the remaining features are primarily relatively long and clear edges corresponding to the nodule boundary (the feature of interest) and the rib edges (which can be eliminated later using a "wavelet snake" boundary modeling procedure as described below). The thresholding operation is referred to herein as $T_{\theta \in \pi}$, where $\theta$ and $\pi$ indicate the threshold values for length and average intensity, respectively, of an edge segment. Using this notation, a thresholded edge representation at filter scale j can be expressed as $T_{\theta \in \pi} M_{\vec{\omega}} I(\vec{x})$. The effect of the thresholding operation $T_{\theta \in \pi}$ on the overall performance will be described hereinafter.

An exemplary edge detection procedure according to the invention is illustrated in FIG. 19. The edge detection procedure is applied to a filtered array of data (e.g., a two-dimensional array of wavelet coefficient magnitudes such as $M_{\vec{\omega}} I(\vec{x})$ of Equation (4)). The procedure of FIG. 19 includes a local maximum detection procedure 1914, an edge segment formation/grouping procedure 1916, and a segment thresholding procedure 1930. Upon starting the local maximum detection, the procedure 1914 (which begins with step 1902), the first data point (e.g., a corner point) of the filtered array is chosen (step 1904) and, for this point, the direction of the gradient of the data array is determined (step 1906). The procedure then finds and stores a local maximum (e.g., the first local maximum) in the direction of the aforementioned gradient (step 1908). If the last point in the filtered data array has been analyzed (step 1910), the procedure then continues to step 1918. If not, the next point is determined (step 1912) and the procedure loops back to step 1906.

Step 1918, the first step of the edge segment formation/grouping procedure 1916, initializes the segment formation/grouping procedure at a selected first local maximum from among the maxima detected in the local maximum detection procedure 1914. If there are no neighboring (e.g., adjacent or nearby) local maxima (step 1920), the procedure continues to the next local maximum (step 1928) and then loops back to step 1920. If there is at least one neighboring local maximum, the procedure continues to step 1922 in which the current local maximum is checked to determine whether or not it has already been grouped to be part of an edge segment. If the current local maximum has already been grouped, the procedure advances to the next local maximum (step 1928). If not, the current local maximum is grouped into an edge segment (step 1924) and checked to determine whether or not it is the last local maximum which is to be tested and/or grouped (step 1926). If the current local maximum is not the final one, the procedure continues to the next local maximum (step 1928). If the current local maximum is the final one, the edge detection procedure continues to the segment thresholding procedure 1930.

The segment thresholding procedure 1930 begins with step 1932 which initializes the segment thresholding procedure to examine a selected first edge segment. The segment is tested with regard to its length (step 1934) and average brightness (step 1938). If the segment is both sufficiently long and sufficiently bright, the segment is kept (step 1940). If not, the segment is discarded (step 1936). The thresholding procedure then determines whether the last segment of interest has been tested (step 1942). If not, the next segment is chosen (step 1944) and the procedure loops back to step 1934. If the last segment of interest has been examined, the procedure is terminated (1946).

Wavelet Snake

In accordance the present invention, a "wavelet snake" procedure is used for classification of detected features into categories (e.g, nodules and false positives). Various investigators have used snake models to identify the boundary of an object. [9] [10] [11] [12] [13] The wavelet snake of the invention technique employs a model-based approach which seeks to determine the closed boundary of a smooth, circular object in an image. In chest radiographs, nodules often appear as round objects, but the nodules can be overlapped with normal structures, such as vessels (e.g., blood vessels) and ribs, which appear as elongated, line-like objects. Therefore, a procedure which differentiates round objects from elongated objects using wavelet snakes can be highly useful for identifying nodules overlapped with, or embedded within, (i.e., partially hidden by) background structures.

A multiscale edge representation does not necessarily provide a complete description of the boundary of a detected feature. In many cases, multiscale edges consist of fragmented edge segments having various values of length, intensity, curvature, and smoothness. The fragmented nature and the variation of the segments can be caused by disturbances such as noise, lung texture, and normal background structures such as vessels and ribs. To estimate the "true" boundaries of detected features, a method according to the invention can utilize a curved trajectory such as a "wavelet snake" (i.e., a deformable contour having a size and morphology which can be varied using a wavelet transform).

Wavelets have been shown to provide computationally efficient deformation procedures in some cases. [17] The wavelet snake of the invention is adjusted by a "region growing" procedure to fit a set of detected edge segments, whereupon the morphology (i.e., shape) of the adjusted (i.e., fitted) snake can be analyzed to obtain morphological characteristics of a feature or candidate pattern. Such morphological characteristics include the circularity, irregularity, and size of a feature. In the region growing technique, a snake (for example, a small, essentially round snake) is enlarged and deformed to fit a set of detected edge segments. The set of detected edge segments is used as an estimate of the boundary of a feature in order to "guide" the deformation of a snake.

A continuous wavelet snake on a plane $\vec{s} \in R^\Theta$ (i.e., $\vec{s}$, which exists on a two-dimensional plane of real numbers) can be defined as:

$$\vec{s} = \begin{pmatrix} s^\Theta(t, \vec{w}^\Theta) \\ s^\theta(t, \vec{w}^\theta) \end{pmatrix} \quad (5)$$

where $t \in [0,1)$ (i.e., t, which can range from 0 to 1) is a contour parameter of the snake. $\vec{s}$ is, in fact, a parametric function of t. $\vec{w}^\xi$ (i.e., $\vec{w}$ and $\vec{w}^\Theta$) are parameters that determine the shape of the snake as defined below. The contour parameter t can be expressed as a sequence of discrete values $t_n$, the sequence being divided into N intervals of equal width such that $t_n = n/N$ (where $0 \leq n \leq N-1$). A discrete snake (i.e., a snake represented by a finite number of snake points) can be produced by providing a "lattice" of contour parameter points (i.e., a discreet set of $t_n$ points). The lattice of contour parameter points, which is a one-dimensional array, will be referred to herein as "$\vec{t}$", which is defined as $\vec{t} = (t_n, 0 \leq n \leq N-1)$. The resulting snake can then be defined as:

$$\vec{s} = (\vec{s}_\varphi)_{\eta \leq \varsigma \leq \phi - \Theta}, \vec{s}_\varphi \equiv \begin{pmatrix} s_\varphi^\Theta(\vec{w}^\Theta) \\ s_\varphi^\theta(\vec{w}^\theta) \end{pmatrix} \equiv \begin{pmatrix} s^\Theta(t_\varphi, \vec{w}^\Theta) \\ s^\theta(t_\varphi, \vec{w}^\theta) \end{pmatrix} \quad (6)$$

It is to be understood that the intervals (e.g., $t_n - t_{n-1}$) between successive points of the array $\vec{t}$ can be, but are not necessarily, uniform.

If $\psi(x)$ is a one-dimensional orthogonal wavelet on R (i.e., $\psi(x)$ exists within a one-dimensional range of real numbers) and $\phi(x)$ is the corresponding scaling function [16], then the wavelet $\psi_{j,k}(x)$ and the scaling function $\phi_{j,k}(x)$ can have a particular scale (i.e., resolution level) j and a particular amount of translation (i.e., a particular location) k. In this case, $\psi_{j,k}(x)$ is defined by dilation (i.e., stretching or contraction) and/or translation (i.e., shifting in position/location) of a "mother wavelet" $\psi(x)$. The mother wavelet $\psi(x)$ is the basic mathematical function or data array upon which the dilated and/or translated wavelets are based. Furthermore, the scaling function $\phi_{j,k}(x)$ can, in a similar fashion, be based on a "mother" scaling function $\phi(x)$. More specifically, $\psi_{j,k}(x)$ and $\phi_{j,k}(x)$ can be defined in a manner similar to Equation (3) as follows:

$$\psi_{pullout;zu772900.001}(x) = \psi(x/2^\omega - k)/\sqrt{2^\omega}, \phi_{pullout;zu772900.001}(x) = \phi(x/2^\omega - k)/\sqrt{2^\omega}. \quad (7)$$

A wavelet snake having a length N can then be defined as:

$$\vec{s} = \begin{pmatrix} s_\varphi^\Theta(\vec{w}^\Theta) \\ s_\varphi^\theta(\vec{w}^\theta) \end{pmatrix}_{\eta \leq l \leq \phi - \Theta} = \begin{pmatrix} c^\Theta + \sum_{\omega\Theta}^{\upsilon} \sum_{\varrho=\eta}^{\varrho^{L-j-\Theta}} w_{\mathbf{q}}^\Theta \psi_{\mathbf{q}}(\vec{t}) \\ c^\theta + \sum_{\omega\Theta}^{\upsilon} \sum_{\varrho=\eta}^{\varrho^{L-j-\Theta}} w_{\mathbf{q}}^\theta \psi_{\mathbf{q}}(\vec{t}) \end{pmatrix} \quad (8)$$

where $c^l$ (l=1,2) is defined as the mean value of $$s_\varphi^\varsigma \left( \text{i.e., } c^\varsigma \equiv \frac{1}{N} \sum_{\varphi=\eta}^{\phi - \Theta} s_\varphi^\varsigma \right).$$

The maximum scale of the wavelet transform, referred to herein as "L", is a constant defined as $L = \log_2 N$. In this example, the length (i.e., the number of discrete points) of the wavelet snake N is assumed to be a power of two in order to allow a "fast wavelet transform" calculation (a highly efficient wavelet transform procedure which can operate most efficiently upon an array having a number of elements which is a power of 2) to be performed. [16] The above set of wavelets is periodic on the lattice $\vec{t}$ (i.e., the wavelet functions repeat themselves with a cyclical period corresponding to the range of values of $t_n$) so that the snake $\vec{s}$ is constrained to be a closed curve (i.e., a closed wavelet snake). It is to be understood that the wavelets $\psi_{j,k}$ in Equations (7) and (8) are not necessarily the same wavelets used in generating the multiscale edge representation described earlier. The mother wavelet used for generating the aforementioned wavelets can be the Daubechies' wavelet, the Symmlet (also known as the Least Asymmetric Daubechies' wavelet), the Mayer's wavelet, the Battle-Lemarie' wavelet, the Coiflet wavelet or another mother wavelet as will be well-understood by those skilled in the art.

Figure 3:
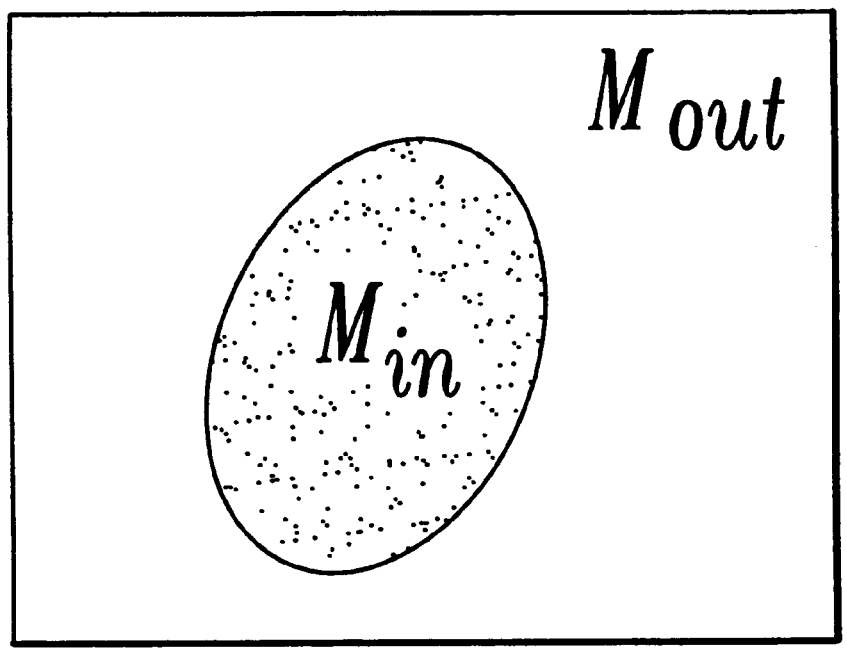
FIG. 3 is a model image of a feature to be fit with a wavelet snake in accordance with the invention.

The deformation of a wavelet snake is performed according to a model-based procedure in which the shape of the wavelet snake is changed to match a model feature representing the shape of a feature of interest within a particular image. The model feature used in this example corresponds to an image with a black region $M_{in}$ having a mean pixel brightness (i.e., intensity) value $m_{in}$, the black region being surrounded by a white region $M_{out}$ having a mean pixel brightness value $m_{out}$ (wherein $m_{out} > m_{in}$), as illustrated in FIG. 3.

A wavelet snake is used to identify the boundary between these two regions. To fit the snake to the boundary, a "cost function" having the following form is used:

$$H = H_{xp} + H_{\omega\xi} \quad (9)$$

$$H_{xp} = x_{xp}(K, \vec{s}; m_{xp}) = \int_{H_{in}} (K(\vec{x}) - m_{xp})^\Theta d\vec{x} \quad (10)$$

$$H_{\omega\infty} = H_{\omega\infty}(K, \vec{s}; m_{\omega\infty}) = \int_{H_{out}} (K(\vec{x}) - m_{\omega\infty})^\Theta d\vec{x} \quad (11)$$

where $K(\vec{x})$ is the pixel value (i.e., brightness of a pixel) of a given image K at $\vec{x} = (x,y)$. The cost function H provides an indication of how closely a particular snake fits the boundary between the inner and outer regions $M_{in}$ and $M_{out}$. More specifically, the value of H tends to become smaller as the fit improves but larger as the fit worsens. The integration of the first term $H_{in}$ of Equation (9) is performed over an area $A_{in}$ which is defined as the internal area circumscribed by the snake $\vec{s}$. Similarly, the integration of the second term $H_{out}$ is calculated over an area $A_{out}$, which is defined as the area outside the snake.

Considering an example in which K corresponds to the above model image, if a snake of a particular size and shape is completely confined within $M_{in}$, then the value of the cost function H becomes greater than zero because $H_{in}=0$ and $H_{out}>0$. The value of H also becomes greater than zero if the snake is completely outside $M_{in}$ because, in this case, $H_{in}>0$ whereas $H_{out}=0$. The cost function H becomes zero if and only if the snake precisely fits the boundary of the two regions $M_{in}$ and $M_{out}$, because both $H_{in}$ and $H_{out}$ become zero in this case. In practice, H may not actually reach zero, but can exhibit a minimum under properly fitted conditions. Consequently, by utilizing a procedure which deforms the wavelet snake to progressively minimize (i.e., converge upon the minimum of) the cost function H, the snake can be reshaped to fit the boundary between the two regions (i.e., the boundary of $M_{in}$). [18]

It is to be understood that the parameters $m_{in}$ and $m_{out}$ can be defined in advance (i.e., can be fixed at predetermined values) and, in addition, can be adjusted according to prior experimental results and/or knowledge in order to improve the performance of a snake-fitting procedure.

Minimization of a cost function H can be performed by updating a set of weights $w^{x_\kappa}_{\xi\varrho}$ (i=1,2) using a gradient descent procedure. For example, the weights $w^{x_\kappa}_{\xi\varrho}$ can be updated as follows:

$$w^{x}_{\xi\varrho} \leftarrow w^{x}_{\xi\varrho} - \eta \frac{\partial H}{\partial w^{x}_{\xi\varrho}}, \quad J \le j \le L, 0 \le k \le 2^{\upsilon - \varpi} - 1, \quad (12)$$

where $\eta$ is a small constant specifying a step size of the gradient descent procedure. The partial derivative can be obtained from Equations (8)–(11) in a closed form (i.e., $\partial H/\partial w^{x}_{\xi\varrho}$ can be computed directly from a formula without resorting to an iterative convergence procedure). Because this derivative can be calculated using a "fast wavelet transform" procedure, the deformation of the snake can be computationally inexpensive (and, therefore, fast), whereas conventional snake models involve computationally expensive energy minimization processes.

More specifically, by using an orthogonal wavelet transform, it is possible to obtain a formula for the partial derivative of the cost function $\partial H/\partial w^{x_\kappa}_{\xi\varrho}$ in Equation (12), as next described:

Using the definitions $K_{xp}=(K-m_{xp})^\theta$ and $K_{\omega\infty'}=(K-m\omega\infty')^\theta$, where K is an image being analyzed, the cost function H of Equation (9) can be written as:

$$H = \int_{\Pi_{in}} K_{xp} d\vec{x} + \int_{\Pi_{out}} K_\omega d\vec{x} \quad (13)$$

$$= \int_{\Pi_{in}} (K_{xp} - K_{\omega''}) d\vec{x} + \left[\int_{\Pi_{in}} k_{\omega''} d\vec{x} + \int_{\Pi_{out}} K_{\omega''} d\vec{x}\right] \quad (14)$$

$$= \int_{\Pi_{in}} h d\vec{x} + \int_\Pi K_{\omega''} d\vec{x}, \quad (15)$$

where the function h is defined as:

$$h = K_{xp} - K_{\omega\infty'} = (K-m_{xp})^\theta - (K-m_{\omega\infty'})^\theta, \quad (16)$$

and $A \equiv A_{xp} + A_{\omega\infty}$ is the entire area of the image K. Because the second term in Equation (15) is always a constant, we can denote this term as $C \equiv \int K_{\omega\infty} dx$. Therefore, using the definition $\tilde{H} = H - C = \int_{\Pi_{in}} h \, dx$, the partial derivative of H with respect to a wavelet coefficient $w^{x_\kappa}_{\xi\varrho}$ is equal to the partial derivative of $\tilde{H}$ with respect to $w^{x_\kappa}_{\xi\varrho}$. As a result, $$\frac{\partial H}{\partial w^{x}_{\xi\varrho}} = \frac{\partial \tilde{H}}{\partial w^{x}_{\xi\varrho}} = \int_\eta^\Theta h|J| dt, \quad (17)$$

where $|J|$ is a Jacobian for the change of parameters, defined as:

$$|J| = \begin{vmatrix} \frac{\partial s^\Theta}{\partial t} & \frac{\partial s^\theta}{\partial t} \\ \frac{\partial s^\Theta}{\partial w^{x}_{\xi\varrho}} & \frac{\partial s^\theta}{\partial w^{x}_{\xi\varrho}} \end{vmatrix} = \frac{\partial s^\Theta}{\partial t} \frac{\partial s^\theta}{\partial w^{x}_{\xi\varrho}} - \frac{\partial s^\Theta}{\partial w^{x}_{\xi\varrho}} \frac{\partial s^\theta}{\partial t}. \quad (18)$$

In the following analysis, the mean value $c^1$ in Equation (8) can be assumed to be zero without loss of generality. Assuming that the wavelets $\psi_{j,k}$ in Equation (8) are orthogonal, it follows from Equation (8) that:

$$\frac{\partial s^\varsigma}{\partial w^{\xi}_{\xi\varrho}} = \frac{\partial}{\partial w^{\xi}_{\xi\varrho}} \left\{ \sum_\varepsilon w^\varsigma_\varepsilon \psi_\varepsilon \right\} = \delta^\varsigma_x \psi_{\xi\varrho}, \quad (19)$$

where δ is a "delta function" defined as $\delta^i_j = \{1 \text{ if } i=j\ 0 \text{ is } i\ne j\}$. By substituting Equation (19) and Equation (18) into Equation (17), one can obtain $$\frac{\partial H}{\partial w^{x}_{\xi\varrho}} = \int_\eta^\Theta \left\{ h \frac{\partial s^\Theta}{\partial t} \psi_{\xi\varrho} \delta^\theta_x - h \frac{\partial s^\theta}{\partial t} \psi_{\xi\varrho} \delta^\Theta_x \right\} dt \quad (20)$$

$$= \left[W\left(h\frac{\partial s^\Theta}{\partial t}\right)\right]_{\xi\varrho} \delta^\theta_x - \left[W\left(h\frac{\partial s^\theta}{\partial t}\right)\right]_{\xi\varrho} \delta^\Theta_x, \quad (21)$$

where $[W(f)]_{j,k}$ denotes the wavelet coefficient obtained by the wavelet transform W (i.e, $[W(f)]_{\xi\varrho}$ is defined as $\int f(t)\psi_{\xi\varrho}(t)dt$). It has been assumed herein that the wavelets $\psi_{j,k}$ are periodic on the interval [0,1) of the parameter t, and the snake $\vec{s}$ is also periodic on this interval (i.e., s(t)=s(t+1)).

Equations (16) and (21) provide a formula for the derivative of the cost function with respect to a wavelet coefficient. The computation of the derivative in Equation (21) can be performed quickly by means of a fast wavelet transform. In a discrete formulation, the derivative as $\partial s^\xi_\xi/\partial t$ can be replaced by the difference between the adjacent points.

Another advantage of using the wavelet snake is that a wavelet transform can be utilized for modifying and controlling the shape of the snake by selection of the minimum scale J of the wavelet coefficients being updated, as shown in Equation (12). Therefore, a smooth snake can be obtained at any stage of deformation simply by restricting the allowable range of scales of the wavelet coefficients that define the shape of the wavelet snake. For example, a deformed snake can be caused to maintain a relatively smooth and round shape if J is close to L, because only the wavelet coefficients at several high scales are updated, whereas the wavelet coefficients at lower scales are kept intact. The effect of variation of the minimum scale J on the overall performance will be discussed in further detail hereinafter.

Degree of Overlap Between Fitted Snakes and the Multiscale Edges

The wavelet snake of the invention is used to fit a set of detected edges in order to approximate the boundary of a nodule. Prior to the fitting, the edges surrounding the center are, optionally, thickened (e.g., thickened outwardly) along the radial direction with respect to the center of the image. Then, starting from a small initial snake placed at the center of the image, the wavelet snake can be grown outwardly by iterative application of the update rule given in Equation (12), until the snake sufficiently fits the thickened edges. The aforementioned edge-thickening process can have the advantage of stabilizing the deformation of the wavelet snake during the fitting procedure. The thickening step can be utilized to prevent the wavelet snake from "striding over" thin edges such as those shown in FIGS. 2(i)–2(l), because only a small decrease in the cost function can be obtained if the overlap between the snake and the edge is small. In other words, thickening the edges increases the overlap between the snake and the edges, thereby providing a more pronounced decrease in the cost function as the fit improves.

Figure 4A:
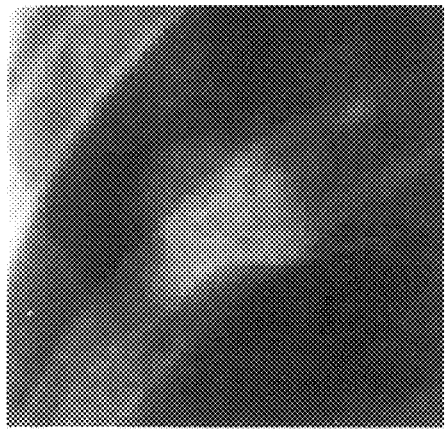
FIG. 4(a) is an example of an ROI of a chest radiograph containing a true nodule.
Figure 4B:
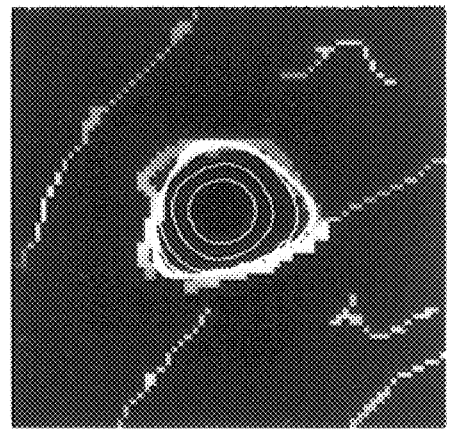
FIG. 4(b) is an illustration of wavelet snakes at several iterations at scale j=3 of an exemplary procedure for fitting an edge representation of the ROI of FIG. 4(a), in accordance with the invention.
Figure 4C:
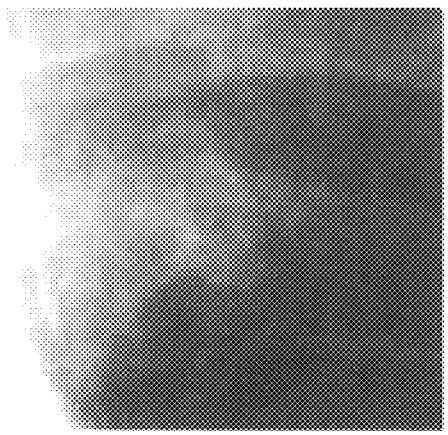
FIG. 4(c) is an example of an ROI containing a false positive.
Figure 4D:
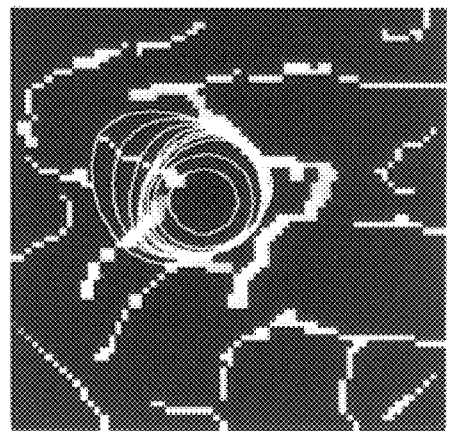
FIG. 4(d) is an illustration of wavelet snakes at several iterations at scale j=3 of an exemplary procedure for fitting an edge representation of the ROI of FIG. 4(c), in accordance with the invention.

As noted, the degree of overlap between a fitted snake and a set of multiscale edges is used as a criterion for classification of nodules and false positives, a technique which is advantageous over region-based methods such as analyzing the circularity and irregularity of a nodule identified by a snake. This is evident from FIGS. 4(a) and 4(c) which show regions of interest (ROIs) containing a true nodule and a false positive, respectively. FIGS. 4(b) and 4(d) show the shapes of wavelet snakes at several iterations of a procedure used to fit the edge representations of FIGS. 4(a) and 4(c). In these examples, the edge representations have both been produced using a filter having a scale of j=3. As shown in FIG. 4(b), when a snake is applied to a nodule, the fitted snake is compact and converges readily and identifies the boundary of the nodule. However, as shown in FIG. 4(d), when a snake is applied to a false positive, the fitted snake is rather divergent and only partly fit the edges, since the edges in this case are caused by ribs.

Figure 5:
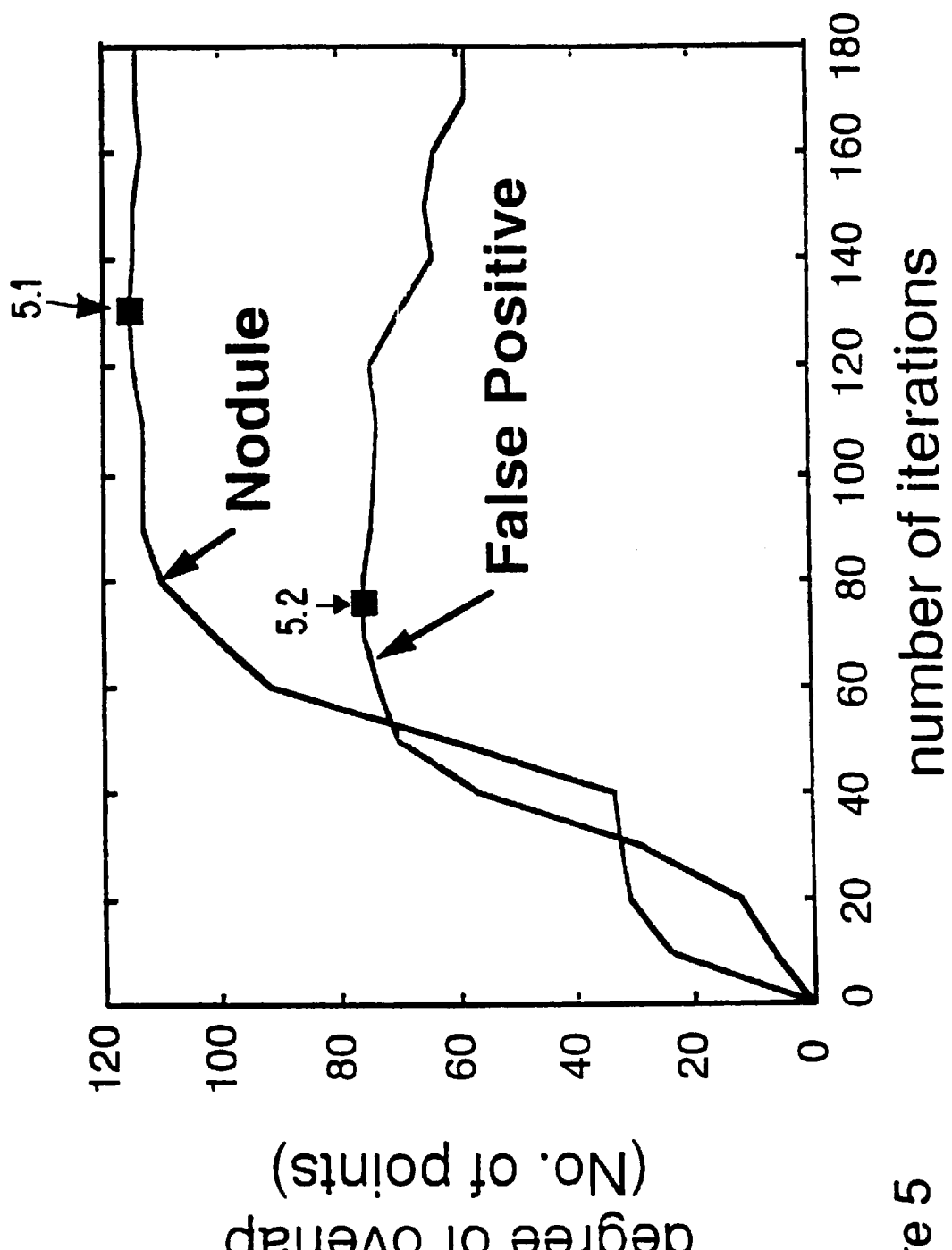
FIG. 5 is a graph of degree of overlap of wavelet snakes and image features as a function of the number of iterations of an exemplary procedure according to the invention, wherein the nodule of FIGS. 4(a) and 4(b) and the false positive of FIGS. 4(c) and 4(d) have been characterized.

At each iteration of a wavelet snake fitting procedure according to the invention, the agreement between a fitted snake and an edge representation at scale j can be measured by calculating the amount (i.e., the degree) of overlap at scale j, which is defined by the number of discrete points on the snake overlapped with edges as follows:

$$D_{\varpi} = \sum_{\varsigma=\Theta}^{\phi} \lambda\left(T_{\theta\in\pi} M_{\varpi} I(\vec{s}_{\varsigma})\right), \lambda = (p) \equiv \begin{cases} 0 \text{ for } p = 0 \\ 1 \text{ for } p \neq 0 \end{cases} \quad (22)$$

where $p = T_{\theta\in\pi} M_{\varpi} I(\vec{s}_{\varsigma})$. The first local maximum of a function representing the degree (or amount) of overlap versus the number of iterations can be defined as a representative amount (i.e., degree) of overlap for a particular ROI. To calculate the representative amount of overlap for an ROI, the value of $D_j$ can, optionally, be averaged at, e.g., every 10 iterations, for smoothing purposes. For example, FIG. 5 is a plot of $D_3$ (i.e., the degree of overlap at scale 3) as a function of the number of iterations of a procedure used to fit wavelet snakes to features in the ROIs of FIGS. 4(a) and 4(c). After the 50th iteration, the degree of overlap for the nodule exceeds the degree of overlap for the false positive. The representative degree of overlap (i.e., the amount of overlap corresponding to the first local maximum of the "overlap versus iterations" function), indicated by the square marks 51 and 52 along the curves of FIG. 5, has a higher value for the nodule than it does for the false positive.

Figure 6A:
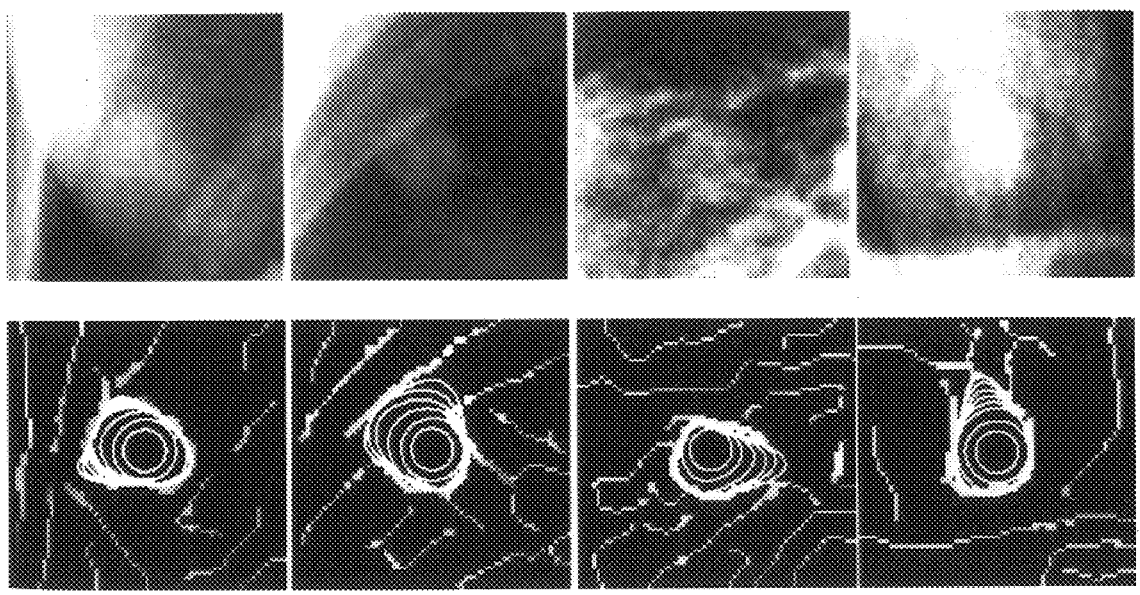
FIG. 6(a) illustrates results of an exemplary fitting procedure according to the invention, wherein true nodules have been characterized.
Figure 6B:
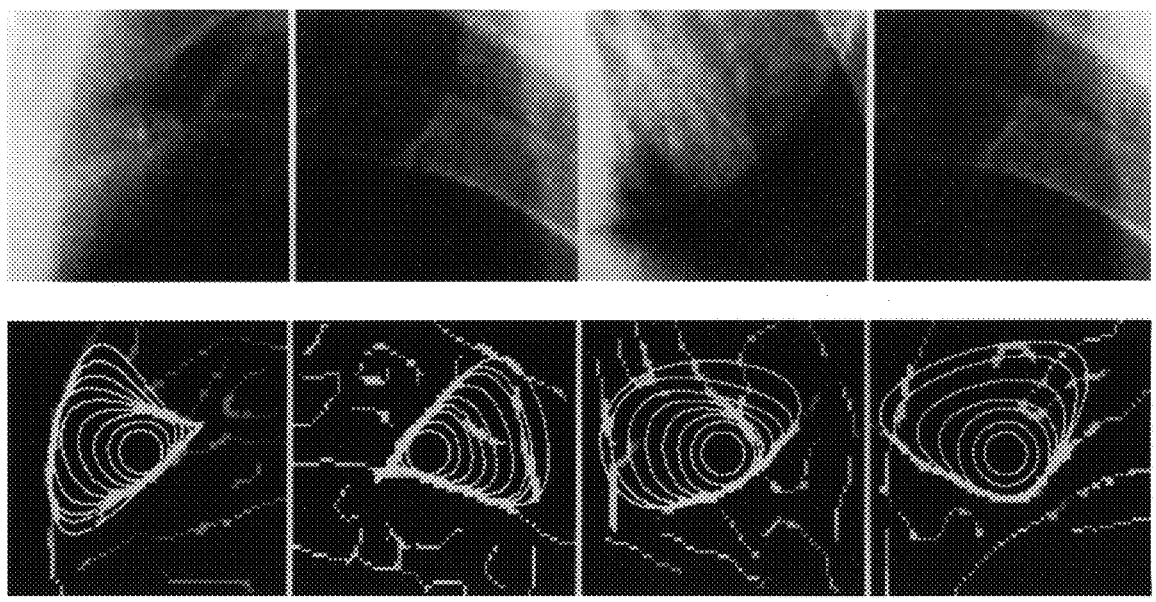
FIG. 6(b) illustrates results of an exemplary fitting procedure according to the invention, wherein false positives have been characterized.

According to an advantageous aspect of the invention, degrees of overlap associated with nodules can be higher than those associated with false positives, an effect that can be used to facilitate identification of features as true nodules or false positives. This result can be achieved because the wavelet snake of the invention can be designed or constrained to form a smooth, round, closed curve that tends to have good agreement with edges representing portions of the boundary of a rounded nodule (as illustrated in the examples in FIG. 6(a)), while tending to exhibit poorer agreement with edges associated with a false positive (e.g., edges consisting of a large number of straight or irregular curves caused by normal structures, as illustrated in examples in FIG. 6(b)). In particular, if the smoothness of a snake is constrained to stay between a minimum smoothness and a maximum smoothness, a true nodule can tend to yield a snake which converges readily to the nodule borders (as illustrated in FIG. 6(a)) whereas, as can be seen by examination of the examples of FIG. 6(b), a false positive can tend to yield a divergent snake (i.e., a poorly fitted snake which does not allow the iterative fitting procedure to converge readily) with a low degree of overlap. Therefore, the degree of overlap of a fitted snake can be used as a measure for classification of nodules and false positives.

Figure 20:
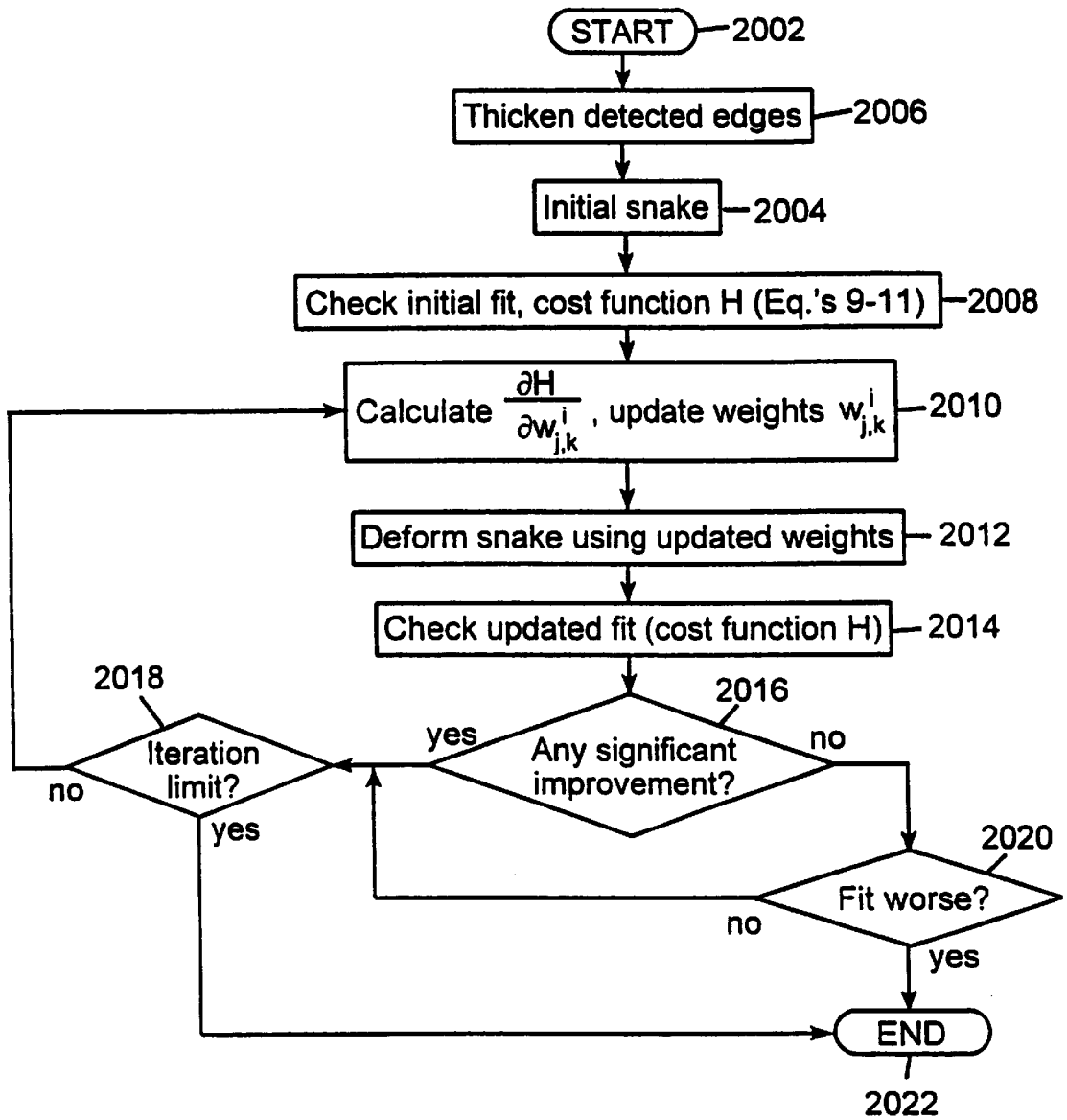
FIG. 20 is a flow chart of an exemplary wavelet snake fitting procedure according to the invention.

An exemplary wavelet snake fitting procedure in accordance with the invention is illustrated in the flow chart of FIG. 20. The fitting procedure (which corresponds to step 2000 in FIG. 18) operates upon a set of edge segments which can be provided by, e.g., the edge detection procedure of FIG. 19. Upon starting the fitting procedure (step 2002 of FIG. 20), the edges can, optionally, be thickened (step 2006) in order to stabilize the deformation of the wavelet snake during the fitting procedure, as described above. Then, an initial snake (i.e., a snake having an "initial shape") is chosen (step 2004). In some cases, the initial shape of the snake is chosen to be that of a circular loop which is smaller than the ultimate expected size of the fitted snake. In particular, the initial snake can be a small circular loop centered within an ROI.

In step 2008, the initial snake is superimposed upon the original ROI image in order to calculate the cost function H (Equations (9)–(11)). Step 2008 can, in some cases, calculate the amount of overlap between the initial snake and the edges.

$$\frac{\partial H}{\partial w_{\scriptscriptstyle{\overline{\varpi}}}^{x,\kappa}}$$

(Equation (12)) is then calculated in order to update the weights $w_{\scriptscriptstyle{\overline{\varpi}}}^{x,\kappa}$ which control the shape of the snake (step 2010). The snake is deformed using the updated weights (step 2012) in order to form a snake having an improved shape, and the cost function H is calculated for the updated snake (step 2014). Step 2014 can, in some cases, calculate the amount of overlap between the current snake and the edges. The procedure then continues to step 2016 which compares the current value of the cost function H to the previous value of the cost function in order to determine if there has been any significant improvement of the "quality of matching" between the snake and the edges. In some cases, step 2016 can detect an improvement in the quality of matching based upon whether H has been reduced by an amount greater than a predetermined threshold or has been reduced by a proportional factor greater than a predetermined proportional factor. In addition, step 2016 can, in some cases, detect an improvement in the quality of matching by comparing the current amount of overlap between the snake and the edges to the previous amount of overlap in order to determine whether there has been a significant increase in overlap. If there has been significant improvement in the fit (e.g., a significant reduction in H or a significant increase in overlap), the procedure checks the number of times the snake has been updated in order to determine whether a predetermined iteration limit has been reached or exceeded (step 2018). If not, the procedure loops back to step 2010 and continues. If the predetermined iteration limit has been reached or exceeded, the procedure is terminated (2022).

If, in step 2016, no significant improvement has been detected, the procedure checks to determine if the fit has become worse since the previous iteration (step 2020). If so, this result is interpreted as an indication that the first local maximum of a "fit quality" versus "number of iterations" curve (e.g. point 51 or point 52 of FIG. 5) has been reached (i.e., a cost function has been minimized and/or an amount of overlap has been maximized), and the procedure is then terminated (2022). If, in step 2020, the fit has not become worse, the procedure continues to step 2018 which, as described above, causes the procedure to terminate if the iteration limit has been reached.

It is to be understood that, although the exemplary fit procedure of FIG. 20 detects an improvement in fit quality (step 2016) in order to decide whether to terminate the procedure, a fit procedure in accordance with the invention can, in addition, utilize a predetermined cost function threshold value and terminate the procedure when the cost function decreases below the cost function threshold value. Furthermore, a fitting procedure in accordance with the invention can utilize a predetermined threshold value for overlap between a snake and a set of detected edges, and can terminate the procedure when the overlap exceeds the overlap threshold value.

It is to be further understood that, although the exemplary cost function H of Equation (9) is of the form $H_{in}+H_{out}$, a cost function in accordance with the invention can be of the form $A-H_{in}-H_{out}$ or of the form $B/(H_{in}+H_{out})$, wherein A and B are constants, without deviating from the scope of the invention. In either of these cases, the cost function will exhibit a maximum, not a minimum, under properly fitted conditions.

In addition to the "steepest descent"-type procedure employed in a preferred embodiment of the present invention, a fitting procedure in accordance with the invention can also utilize a simplex method, or a genetic algorithm, or another procedure, as will be well-understood by those skilled in the art.

Computer System

Figure 17:
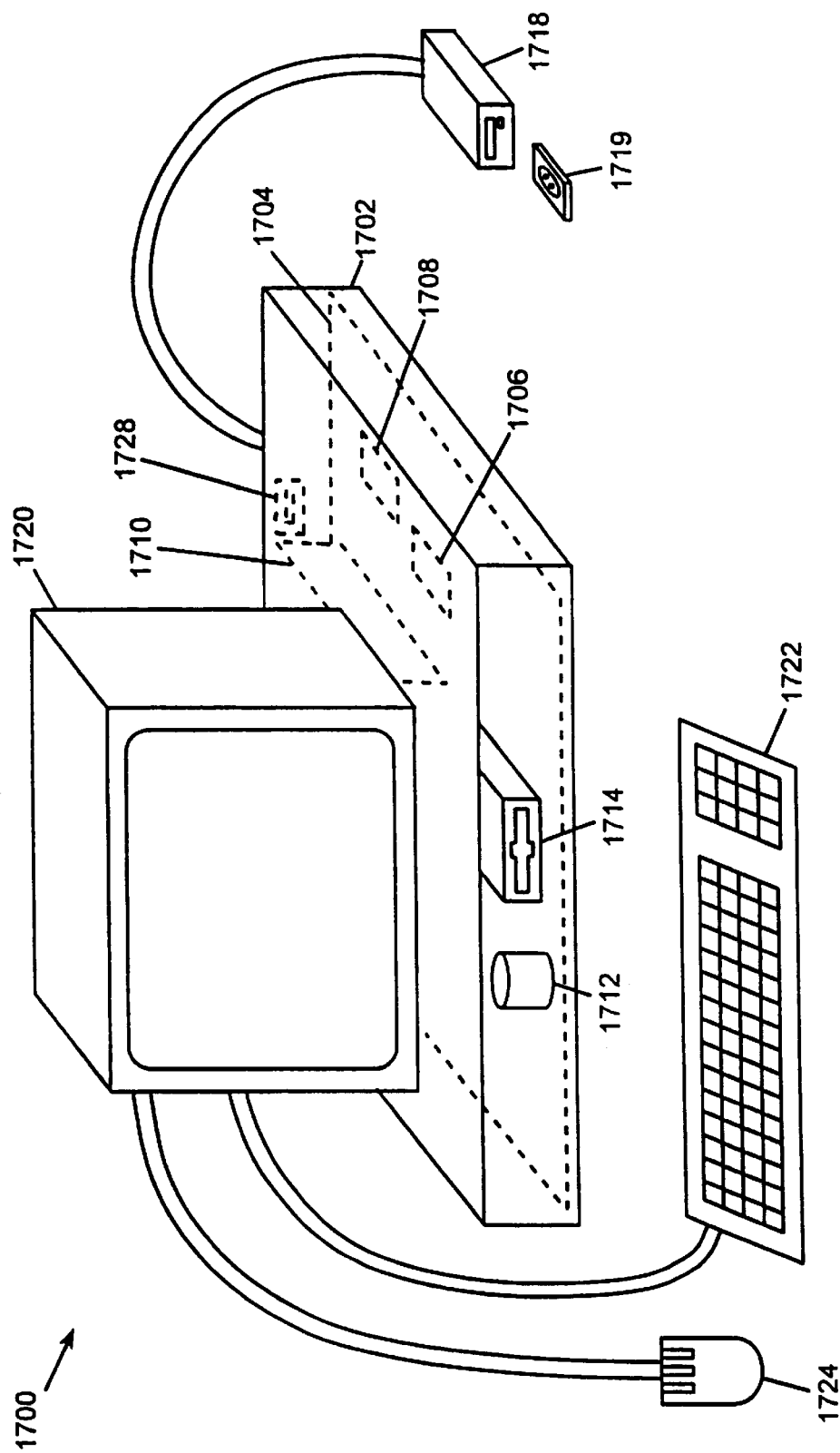
FIG. 17 is a schematic representation of a computer system for performing procedures according to the invention.

In one specific example, a nodule detection procedure in accordance with the invention can be performed by a computer system, illustrated schematically in FIG. 17. This exemplary computer system 1700 has a housing 1702 which houses a motherboard 1704 which contains a central processing unit (CPU) 1706, memory 1708 (e.g., DRAM, ROM, EPROM, EEPROM, SRAM and Flash RAM), and other optional special purpose logic devices (e.g., ASICs) or configurable logic devices (e.g., GAL and reprogrammable FPGA). The computer can also contain a communication port 1728 for communicating with other computers or devices. The computer 1700 further includes plural input devices, (e.g., a keyboard 1722 and mouse 1724), and a display card 1710 for controlling monitor 1720. In addition, the computer system 1700 includes a floppy disk drive 1714; other removable media devices (e.g., compact disc 1719, tape, and removable magneto-optical media (not shown)); and a hard disk 1712, or other fixed, high density media drives, connected using an appropriate device bus (e.g., a SCSI bus or an Enhanced IDE bus). Although compact disc 1719 is shown in a CD caddy, the compact disc 1719 can be inserted directly into CD-ROM drives which do not require caddies. Also connected to the same device bus or another device bus as the high density media drives, the computer 1700 may additionally include a compact disc reader 1718, a compact disc reader/writer unit (not shown) or a compact disc jukebox (not shown). In addition, a printer (not shown) can provide printed copies of useful information related to the nodule detection procedure, such as, e.g., images, graphs and charts representing fit results, and/or text representations of data produced by the nodule detection procedure.

The computer system of FIG. 17 further includes at least one computer readable medium. Examples of such computer readable media are compact discs 1719, hard disks 1712, floppy disks, tape, magneto-optical disks, PROMs (EPROM, EEPROM, Flash EPROM), DRAM, SRAM, etc.

Stored on any one or on a combination of the computer readable media, the present invention includes software for controlling both the hardware of the computer 1700 and for enabling the computer 1700 to interact with a human user. Such software may include, but is not limited to, device drivers, operating systems and user applications, such as development tools. Such computer readable media further includes a computer program, according to the present invention, for performing the nodule detection procedure.

The nodule detection computer can serve as a remote computer, and can allow an operator to "log on" to a host computer which may be connected not only to this particular computer but to other remote computers. The host computer can, optionally, restrict the possible choices that an operator is allowed to make while performing the procedure, thus reducing the risk of operator error.

Combination of the Edge Representations at Multiple Scales

The overall performance of a procedure in accordance with the invention can be enhanced by utilizing edge representations at a plurality of scales. This is because, for some nodules, the edges at a particular single scale can be fragmented due to fuzziness of the nodule boundaries or interference from noise and normal structures, thereby yielding low degrees of overlap. Some of the fragmented edges can be eliminated by threshold operations to remove edges which have insufficient length or insufficient average brightness, as described earlier with reference to FIGS. 2(*e*)–2(*l*). However, in some cases, the results can be still further improved by utilizing edges at a higher scale which can be relatively long and less fragmented and which, therefore, may better represent the boundaries of nodules. In fact, a combination of edge representations at two or more different scales can be used.

For example, if edge representations at several individual scales are tested individually and, among the scales tested, a scale of 3 is found to provide the best results, the performance can, in some cases, be improved still further by utilizing a combination of scales 3 and 4 in the following manner.

First, for a given ROI, the degree of overlap of a fitted snake at scale 3 ($D_3$) is calculated to provide an indication of a first fitted quality of matching. If the degree of overlap is smaller than a certain threshold level, referred to herein as the "combination threshold value," then the degree of overlap of a fitted snake at scale 4 ($D_4$) is calculated to provide an indication of a second fitted quality of matching. The larger of the two values $D_3$ and $D_4$ can then be used as the representative degree of overlap (indicating a representative quality of matching) for the particular ROI being analyzed.

Database

The present invention has been tested using database of 100 PA chest radiographs containing a total of 122 nodules. The presence of these nodules was confirmed by two experienced chest radiologists based on their consensus, as well as by verification based upon CT scans or radiographic follow-up. In this study, a nodule is defined as a focal, intrapulmonary, non-calcified soft-tissue opacity less than 30 mm in diameter, without adjacent infiltrative or consolidative disease.

The original 14"×17" chest radiographs were digitized to 10 bits with a matrix size of 500×500 by use of a Konica laser scanner (KFDR-S). The effective pixel size of the digitized images was approximately 0.7 mm.

A total of 242 ROIs with a matrix size of 64×64 pixels was used to evaluate the performance of an exemplary nodule detection procedure in accordance with the invention. The ROIs consisted of 90 true positives and 152 false positives which had been reported by a preliminary CAD procedure/system for detection of pulmonary nodules in chest radiographs. It is to be noted that the ROIs were obtained after pre-screening by various false-positive elimination processes included in the preliminary CAD procedure.

Based on the above database of 242 ROIs, a Receiver Operating Characteristic (ROC) analysis was performed for evaluation of the overall performance of the aforementioned exemplary procedure of the invention with respect to classification of nodules and false positives. The degrees of overlap obtained from the ROIs in our database were analyzed by a LABROC4 program [19] for generating an ROC curve and calculating the area $A_z$ under the ROC curve. $A_z$ can be used as an indicator of the performance of a nodule detection/classification procedure.

Figure 7:
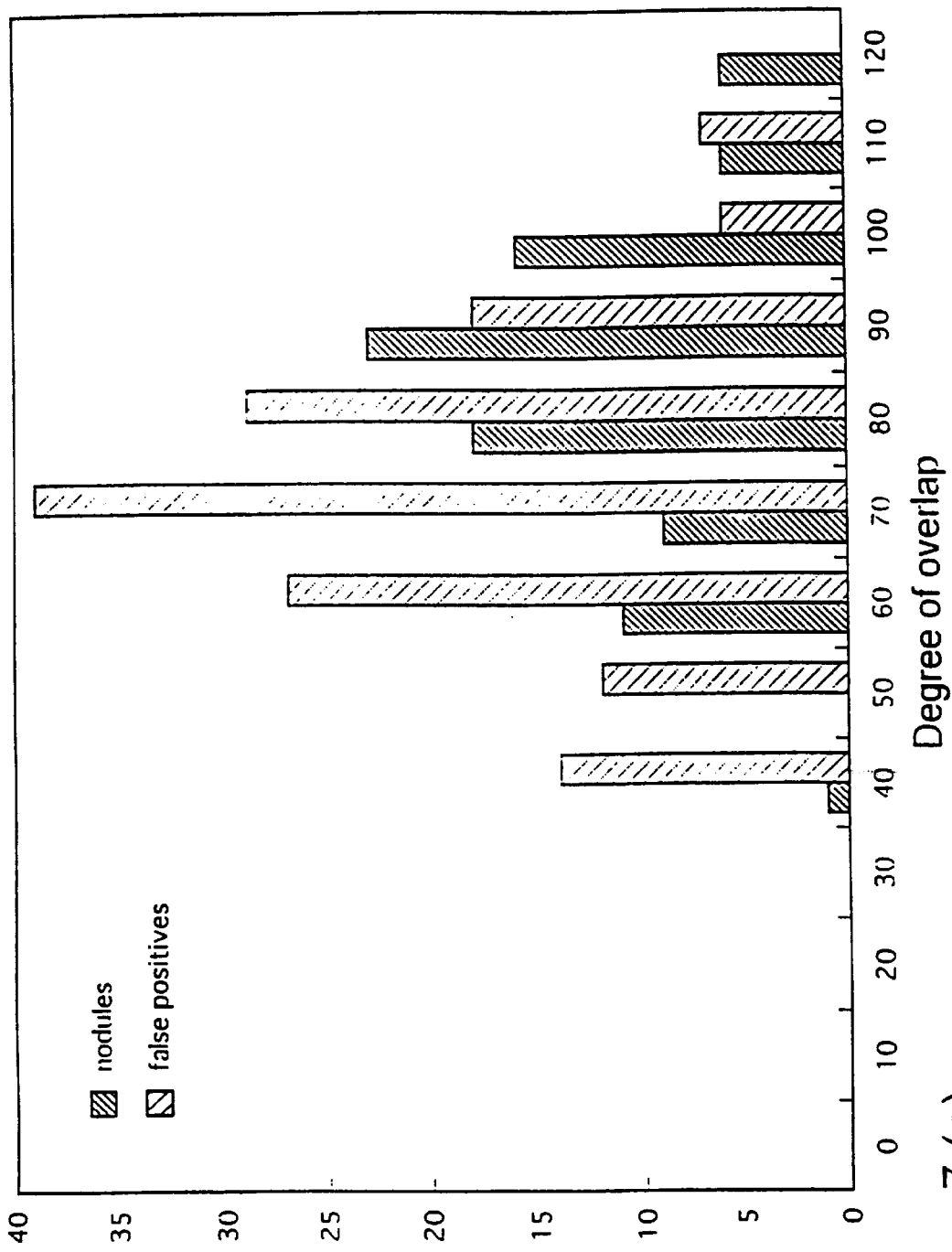
FIG. 7(a) is a histogram representing degree of overlap of wavelet snakes and radiograph features, including data from a database containing 90 nodules and 152 false positives, wherein the nodules and false positives have been characterized by an exemplary fitting procedure according to the invention.
FIG. 7(b) is a receiver operating characteristic (ROC) curve generated from the histogram of FIG. 7(a), wherein degree of overlap is utilized as a classification parameter, in accordance with the invention.
Figure 7:
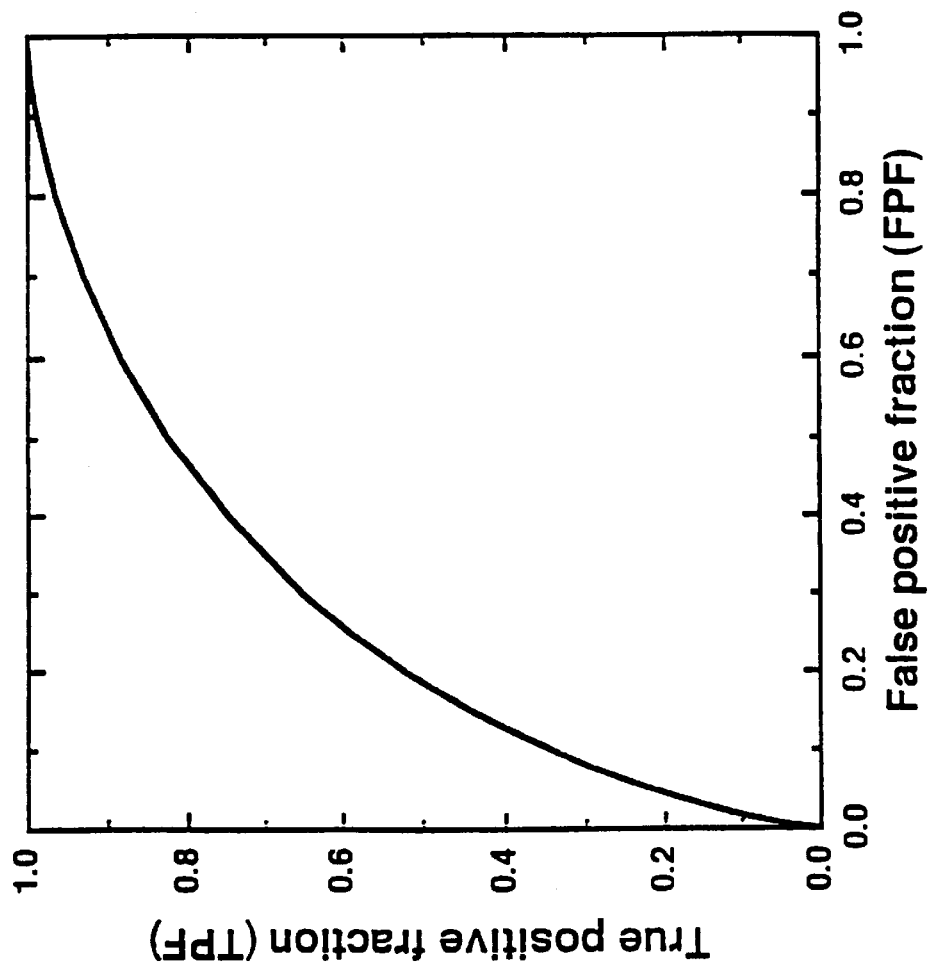

FIG. 7($a$) is a histogram of the degree of overlap for the 90 nodules and 152 false positives in our database. The histogram was obtained using a combination of a edge representations at scales 3 and 4, with the parameters set as shown in Table 1. In the examples of FIG. 7($a$), the degrees of overlap corresponding to nodules tend to be higher than those corresponding to false positives. The performance of the procedure is further indicated by FIG. 7($b$) which illustrates an ROC curve generated from the histogram in FIG. 7($a$). To generate the curve of FIG. 7($b$), a threshold for degree of overlap was used as a criterion to discriminate true positives from false positives. The threshold was varied and used to classify each of the features of the database as either a true nodule or a false positive. For each threshold value, the fraction of features classified as true positives was plotted versus the fraction of features classified as false positives in order to generate the curve of FIG. 7($b$). The ROC curve of FIG. 7($b$) yielded an $A_z$ value of 0.74.

The effects of important parameters (Table 1) were evaluated as follows. Several ROC curves and the associated $A_z$ values were generated by varying each parameter within a certain range while the other parameters were fixed at the values shown in Table 1. It is to be noted that each of the following experiments was performed using an edge representation at a single scale, except for an experiment related to the effect of the combination threshold value, which is described later.

TABLE 1

| Parameter | Symbol | Value |
| --- | --- | --- |
| Scale for edges | j | 3 |
| Threshold for length of edges | θ | 15 |
| Threshold for average intensity of edges | π | 0 |
| Type and length of mother wavelet | ψ | Coiflet 18 |
| Type of cost function | $m_{in}$ | 0 |
|  | $m_{out}$ | 128 |
| Number of discrete points of wavelet snake | N | 128 |
| Minimum scale to be updated | J | 5 |
| Initial center position | — | (32, 32) |
| Combination threshold | — | 60 |

Effect of Scale for Edge Representation

The scale used for the edge representation can significantly affect the initial extraction of the edges corresponding to the boundary of a nodule. Consequently, because the edges are later used to guide the snake in estimating the boundary (i.e., perimeter) of the nodule, selection of the scale can affect the overall classification performance.

Figure 8:
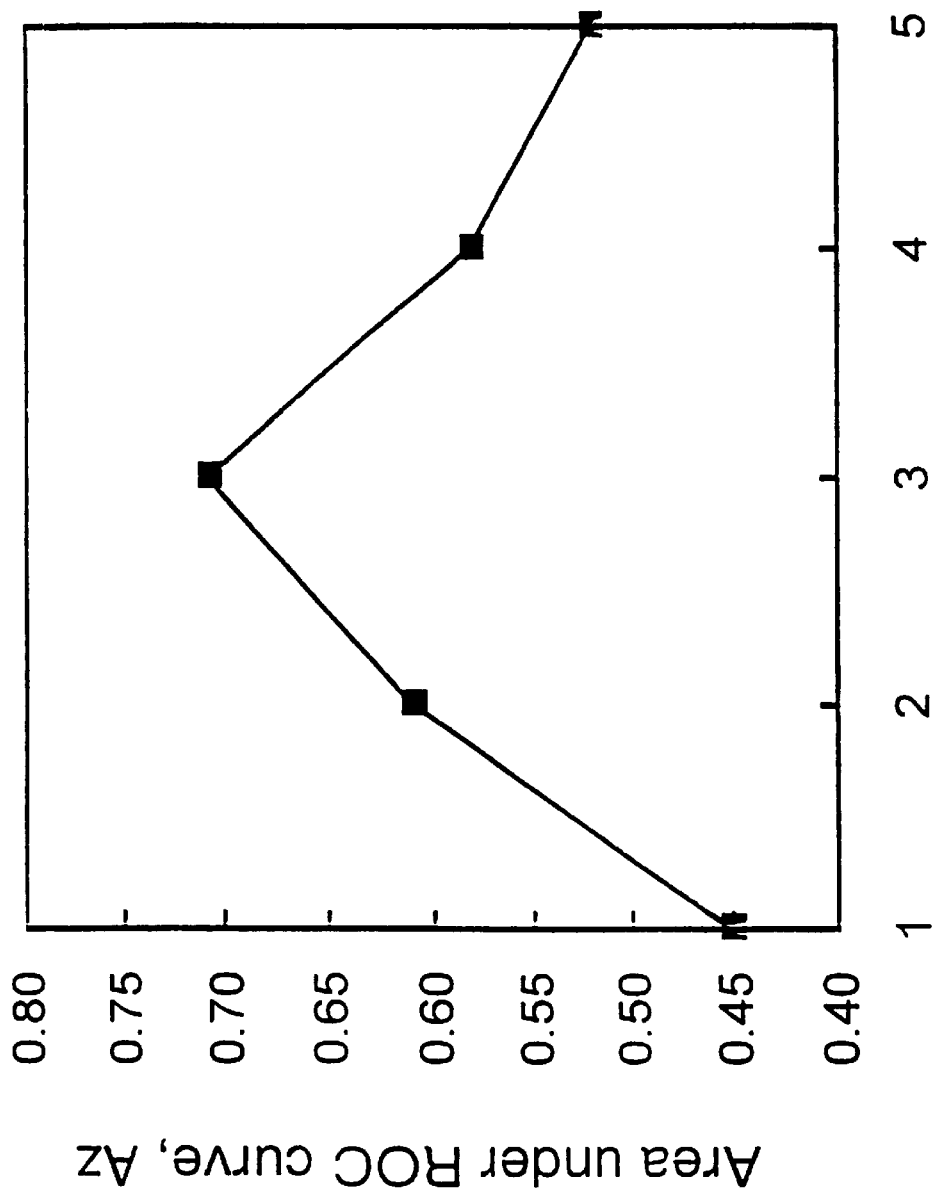
FIG. 8 is a graph of the overall performance of an exemplary feature characterization procedure according to the invention versus selected scale of edge representation.

To investigate the effect of the scale, the $A_z$ values were measured while varying the scale from 1 to 5. $A_z$ reached the highest value at scale 3 and was lower at both lower and higher scales, as illustrated in FIG. 8. This indicates that the boundary of a nodule can, in this case, be most clearly extracted using a scale of 3 (i.e., 3 is "optimum" scale). For example, an edge representation at a scale of 3 is illustrated in FIG. 2($k$). In contrast, edges at scale 1 can, in some cases, correspond primarily to noise components in the original image, as illustrated in FIG. 2($i$). Furthermore, although the nodule boundary can be seen in the edge representation at scale 2 shown in FIG. 2($j$), the nodule edges of this example are heavily overlapped by edges caused by noise and normal structures, which can interfere with the proper deformation of the wavelet snake during the fitting procedure. Therefore, the degree of overlap between the fitted snake and the edges of a nodule can be diminished by using scales which are lower than the optimum value (which is, in this case, 3). In addition, at a scale of 4, only clear and strong portions of the nodule boundary are extracted, and weaker boundaries have been undesirably lost, as is illustrated in FIG. 2($l$). Therefore, the degree of overlap can also be low if the procedure uses a scale which is higher than the optimum value.

Figure 9:
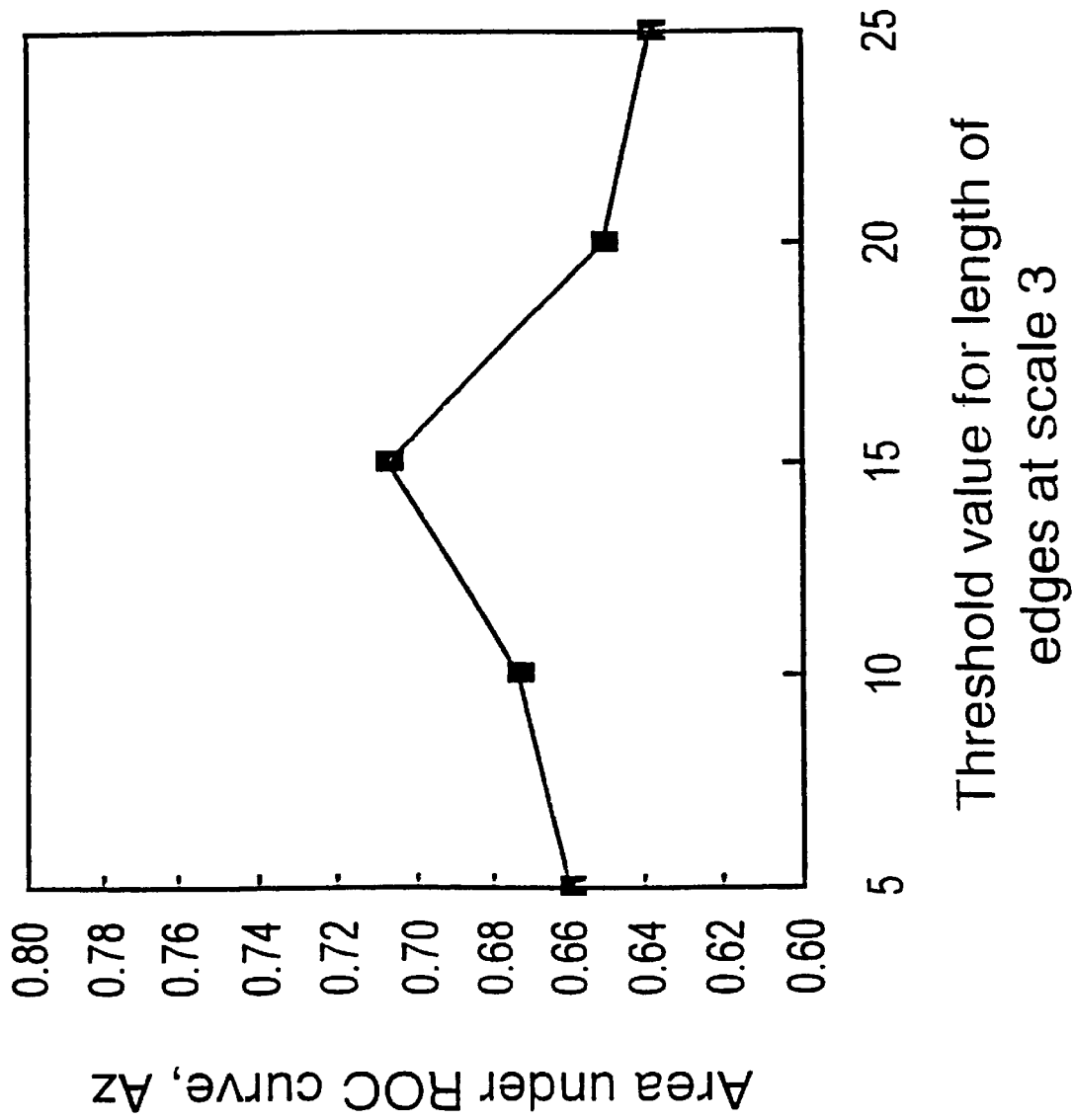
FIG. 9(a) is a graph of the overall performance of an exemplary feature characterization procedure according to the invention versus threshold value for length of edges.
FIG. 9(b) is a graph of the overall performance of an exemplary feature characterization procedure according to the invention versus threshold value for average intensity of edges.
Figure 9:
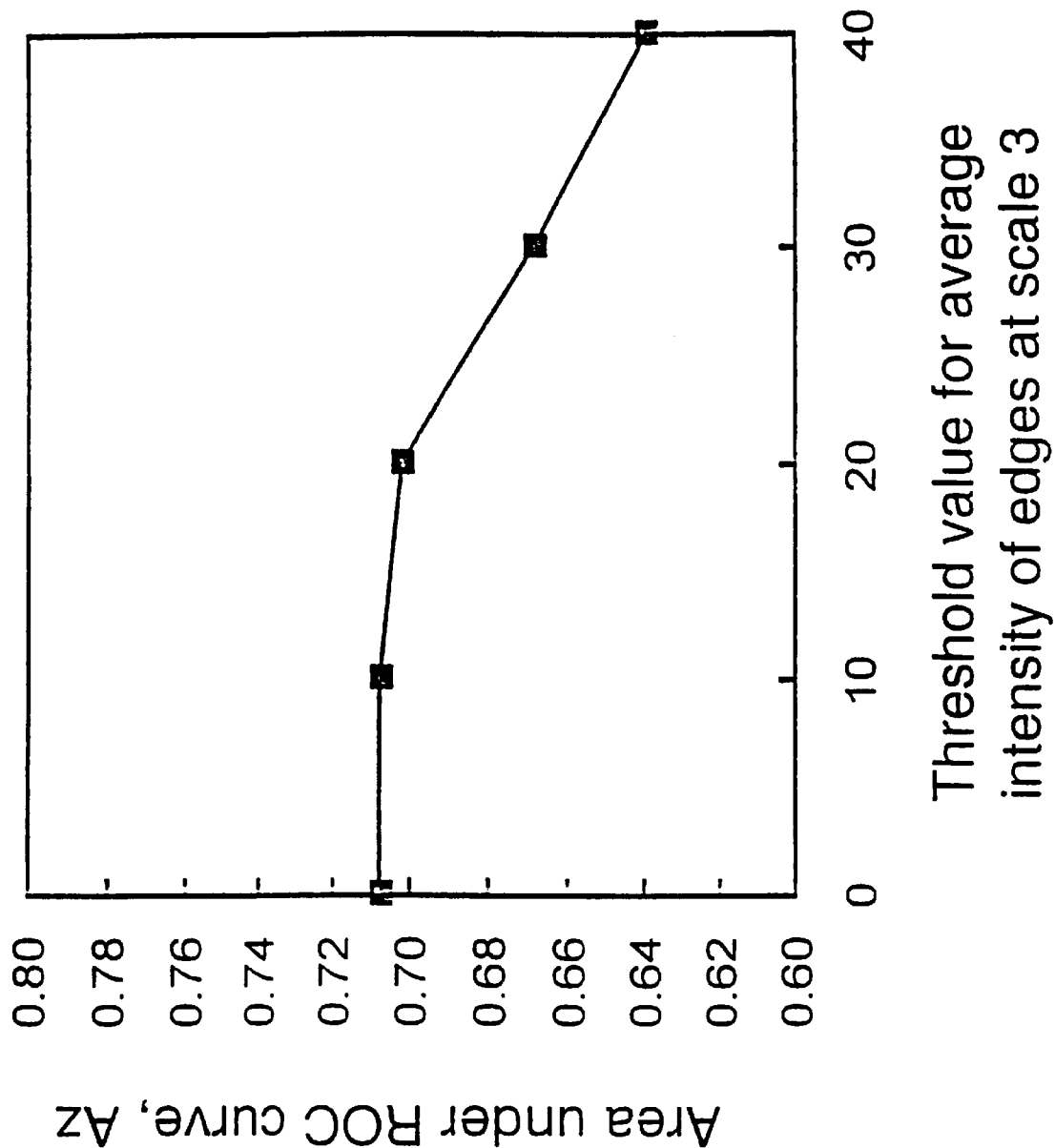

Effect of the Threshold Value for Length and Average Intensity of Multiscale Edges As described earlier with reference to the thresholding operation illustrated in FIGS. 2($e$)–2($f$), short or low-intensity edges in an edge representation can sometimes be attributed to noise in the original image. Therefore, thresholding of edges by length and average intensity (e.g., the aforementioned thresholding operation $T_{\theta\pi}$) can sometimes be used to improve the performance of the nodule detection procedure of the invention by reducing the number of edges attributable to noise. For example, FIG. 9($a$) illustrates the effect of changing the threshold value θ (the threshold for the length of detected edges). In FIG. 9($a$), $A_z$ reaches its highest value at θ=15 and is smaller at both the low and high ends of the range of θ values tested. At low threshold values, $A_z$ increases as θ increases, because more noise-related edge segments are removed as θ is increased. However, $A_z$ becomes lower when the threshold value is too high, because such a high threshold value causes the removal of important long edges corresponding to the boundaries of nodules.

A similar test has been performed to evaluate the effect of the threshold value π (the threshold for average intensity of an edge), as illustrated in FIG. 9(b). In this case, however, $A_z$ is essentially constant for π between 0 and 10. Since this test was done using a θ-value of 15, the flatness of the curve for low values of π indicates that most of the noise-related edges have already eliminated by setting the threshold value for the length of edges (i.e., θ) to 15. For higher values of π, $A_z$ decreases monotonically as the threshold value π is increased, because the larger threshold values cause the undesirable loss of an increased number of edges corresponding to nodule boundaries.

Effect of Type and Length of the Mother Wavelet Defining the Wavelet Snake

Figure 10:
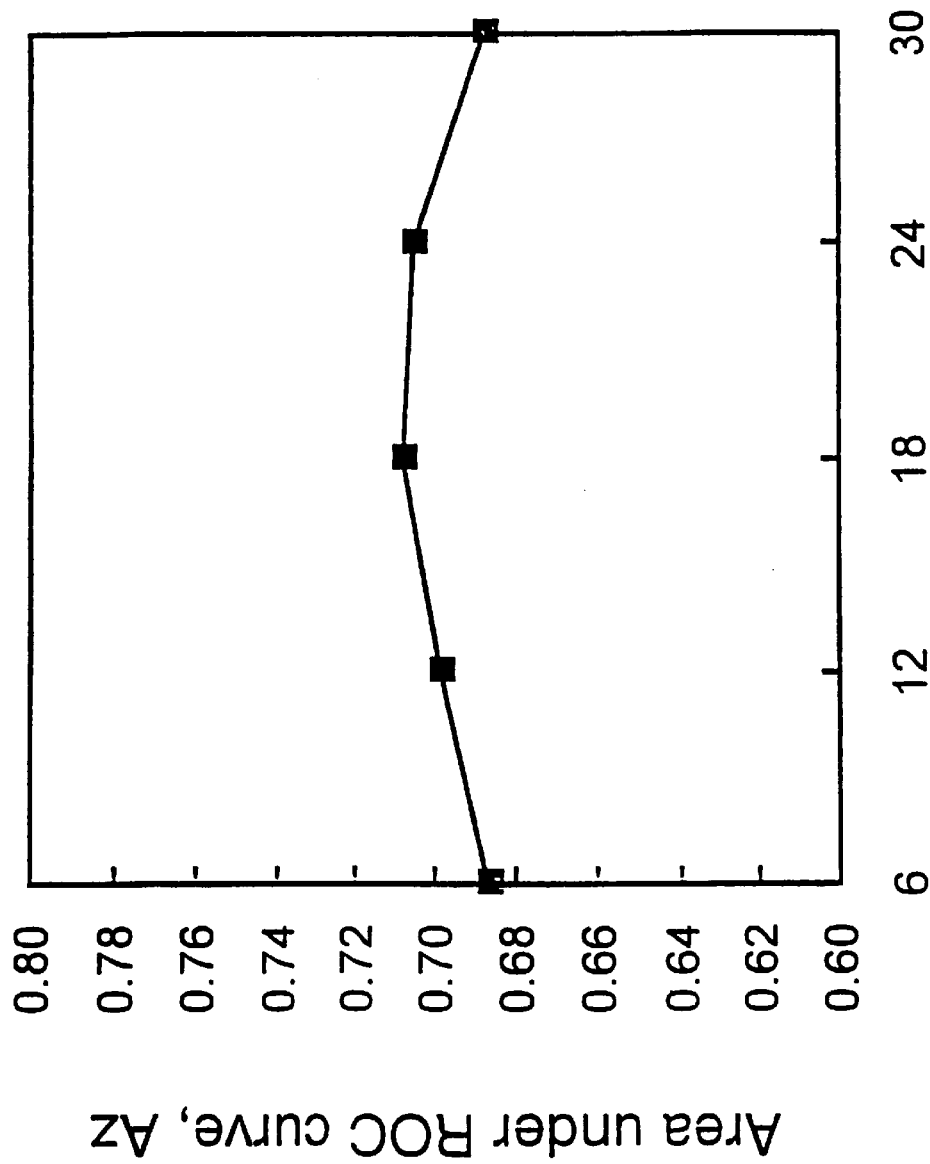
FIG. 10 is a graph of the overall performance of an exemplary feature characterization procedure according to the invention versus the length of a mother wavelet.

Because the snake model of the invention is defined based on a wavelet transform, the choice of the mother wavelet can affect the overall performance. Therefore, the effects of different types and lengths of mother wavelet used in the definition of the wavelet snake given in Equation (8) were investigated. Two types of mother wavelets, a Coiflet and a Symmlet, were investigated. For each of the mother wavelets, the effect of the "range of support" (i.e., the length) on the overall performance was evaluated. FIG. 10 shows the effect of the length of a Coiflet on the overall performance of a fitting procedure according to the invention. The $A_z$ value reached a maximum at length 18, but the overall performance had a relatively weak dependence on the length of the Coiflet. This can be attributed to the fact that only high scales (scales 5 to 7) were used in the update rule in Equation (12) in this experiment, as shown in Table 1. In this range, wavelets can have a similar shape regardless of the length of the mother wavelet.

The insensitivity of the overall performance to the length of the wavelet also applies to a different type of mother wavelet. The change of the $A_z$ value for Symmlets of different lengths was gradual, and the maximum of the $A_z$ value was less than, but close to, the maximum $A_z$ value of the Coiflets.

Effect of the Cost Function

Figure 11:
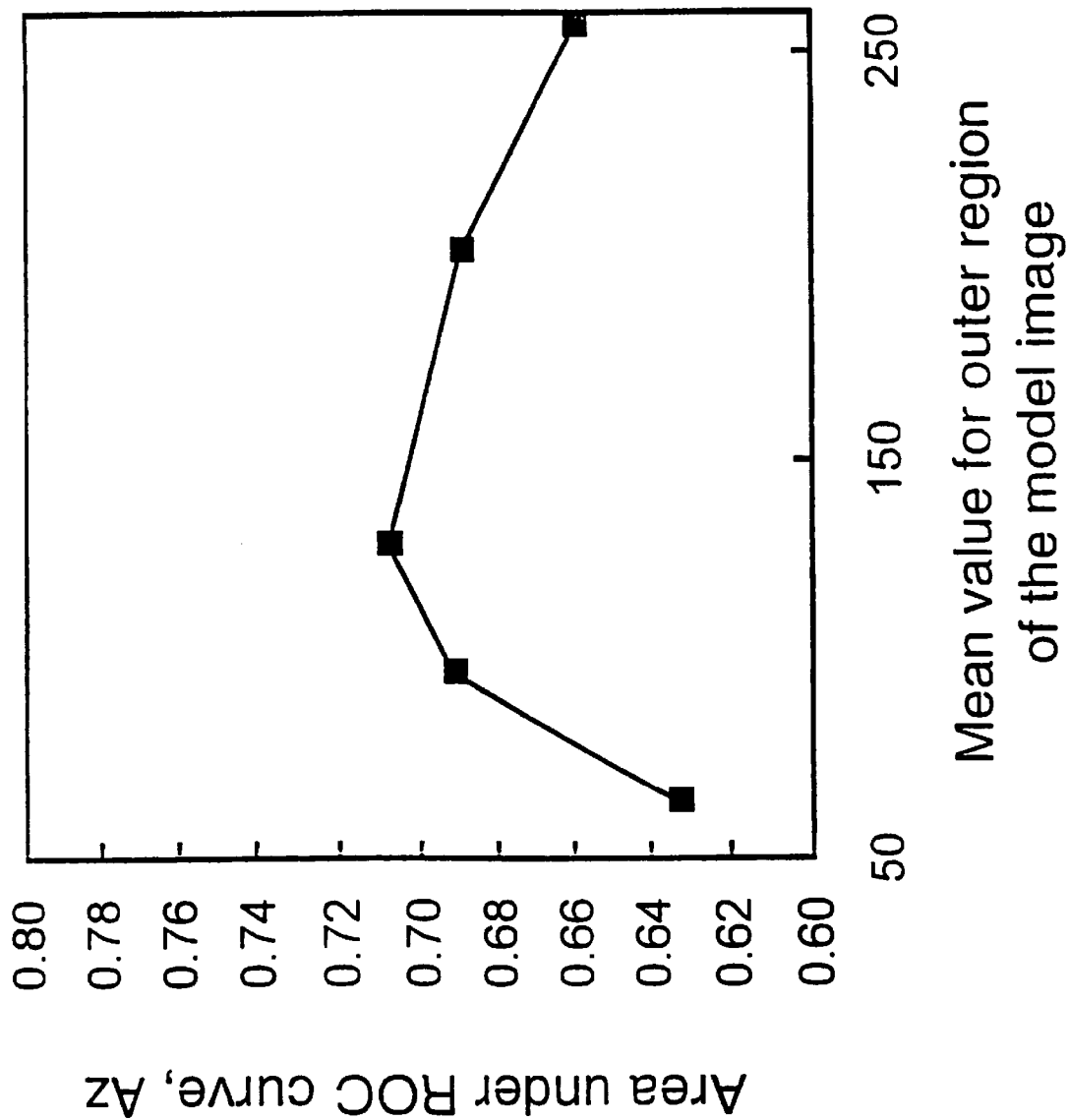
FIG. 11 is a graph of the overall performance of an exemplary feature characterization procedure according to the invention versus mean value of the outer region of a model image.

In addition, the effect of the mean value $m_{out}$ in Equation (11), which defines the intensity difference between the inner region $M_{in}$ and the outer region $M_{out}$ of the model image if $m_{in}$ is set to zero, was investigated. FIG. 11 shows the effect of $m_{out}$ on the overall performance. $A_z$ reached a maximum value at $m_{out}$=128 and decreased at both low and high values. A high value of $m_{out}$ implies that the edges representing the boundary of the two regions $M_{in}$ and $M_{out}$ are expected to have high intensities. In this case, therefore, the wavelet snake regards only edges with high intensity as corresponding to a boundary of a nodule. In other words, the wavelet snake may not fit portions of the boundary of a nodule which are represented by low-intensity edges. However, when $m_{out}$ is low, the wavelet snake may undesirably fit edges caused by noise, since the wavelet snake regards not only high-intensity edges, but also low-intensity edges as portions of the boundary of a nodule. Consequently, an intermediate value of $m_{out}$ provided high overall performance.

Effect of the Number of Discrete Pints of the Wavelet Snake

Figure 12:
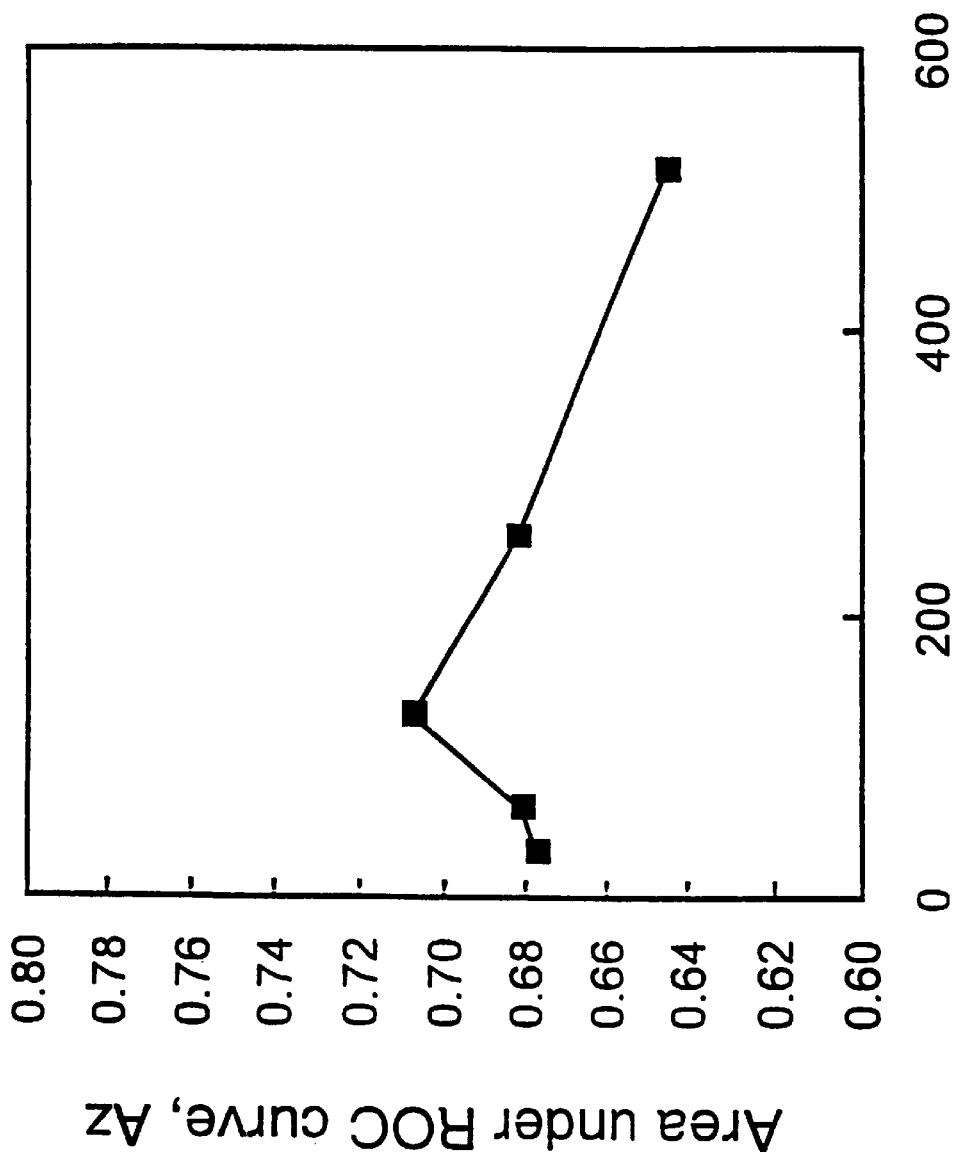
FIG. 12 is a graph of the overall performance of an exemplary feature characterization procedure according to the invention versus the number of discrete points on a wavelet snake.

Also investigated was the effect of the number of discrete points within a wavelet snake (i.e., N, which is used to define L in Equation (8)). In this experiment, the number of points were set to be $2^n$, where $6 \leq n \leq 9$. $A_z$ achieved the highest value when N=128, as shown in FIG. 12. As can be seen in the graph of FIG. 12, below a certain value of N, a larger number of points tended to cause the wavelet snake to fit the edges more faithfully, because the snake more closely approximates a continuous curve as N increases. Therefore, $A_z$ increased as N increased in the range of small values of N. However, when N is too large, the snake can overfit the multiscale edges or can be overly sensitive to relatively short and low-intensity edges caused by noise because, if N is large, a larger number of edge points contributes to the cost function H. Therefore, $A_z$ was observed to decrease when N was in the upper portion of the range of values tested, as shown in FIG. 12.

Effect of Scales Selected for the Wavelet Snake

Figure 13A:
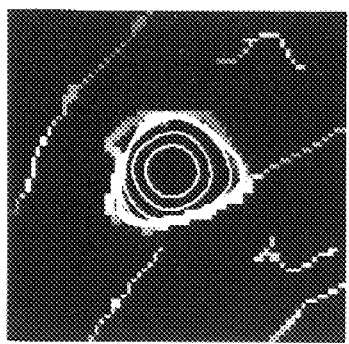
FIGS. 13(a)–13(c) illustrate results of an exemplary wavelet snake fitting procedure according to the invention, wherein three different values of minimum scale have been utilized.
Figure 13B:
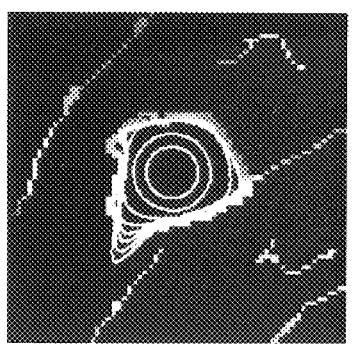
Figure 13C:
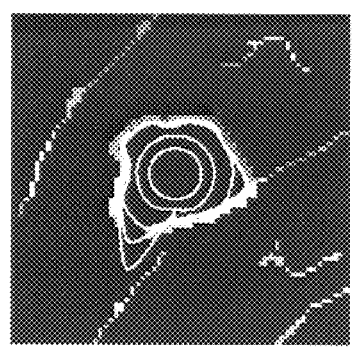
Figure 14:
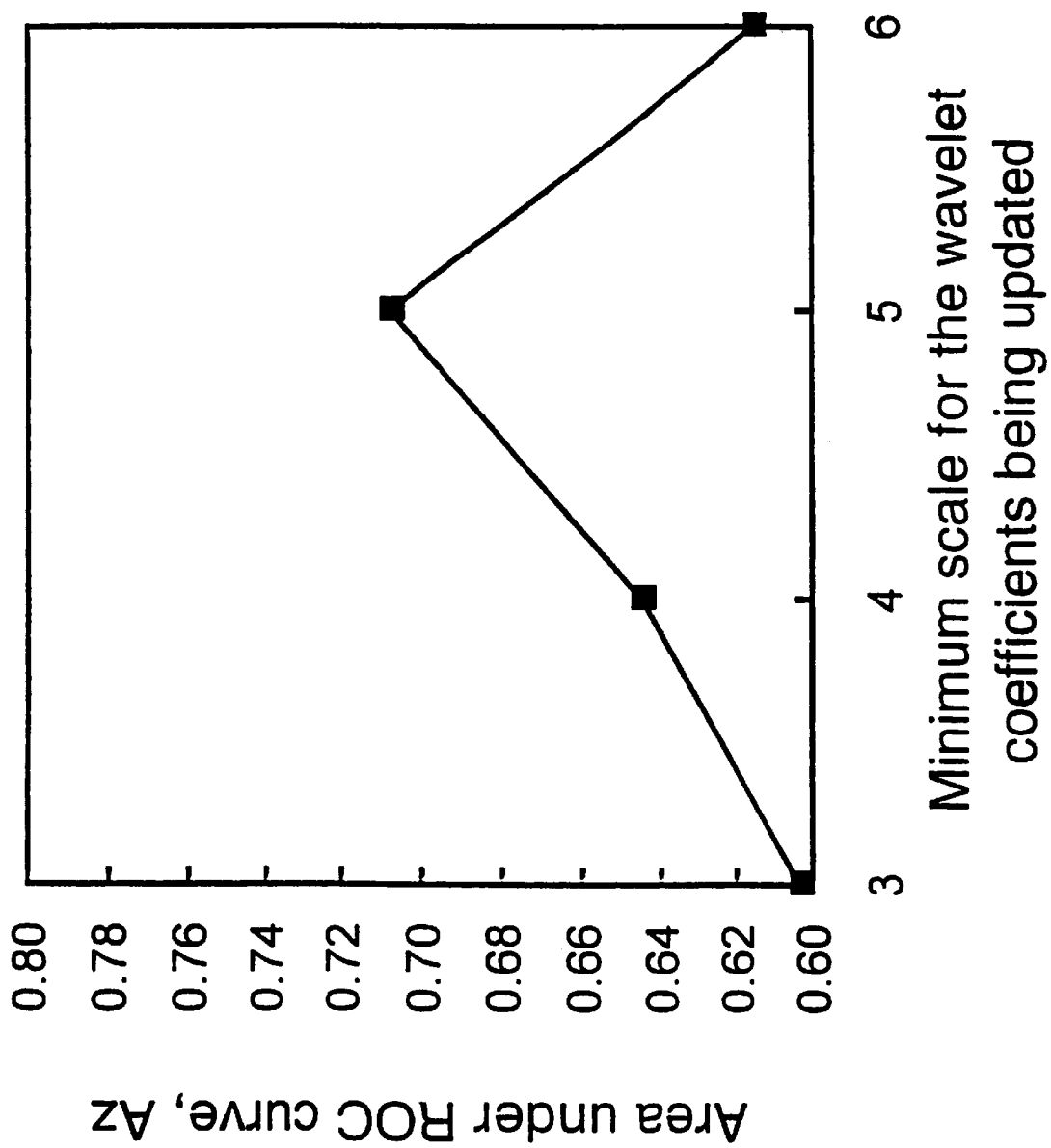
FIG. 14 is a graph of the overall performance of an exemplary feature characterization procedure according to the invention versus minimum scale for wavelet coefficients being updated.

The smoothness of a wavelet snake is affected by the range of scales selected for the snake, or equivalently, the minimum scale J shown in Equation (12), because J restricts the range of scales of the wavelet snake being updated. If J is close to the maximum scale L, then only the wavelet coefficients at high scales are updated, and therefore, the resulting wavelet snake becomes very smooth. Examples of the effect of J on the shape of the snake are shown in FIGS. 13(a)–13(c). FIG. 13(a) shows a fitting process of a wavelet snake with J=5. Only three high scales ($5 \leq j \leq 7$), or 8 out of 128 wavelet coefficients, were updated for this snake. Adding a smaller scale by setting J=4 provides a more faithful fit to the edges, as shown in FIG. 13(b). However, when J=3 (FIG. 13(c)), the wavelet snake accurately fits some portions of the boundary of the nodule while appearing to overfit other portions. Moreover, a wavelet snake with a large range of scales can, in some cases, heavily deform itself to provide an undesirably close fit to elongated edges of ribs. This overly close fit to structures such as rib edges can undesirably increase the degree of overlap for false positives. Because of these effects, $A_z$ reached its highest value when J was 5, and was lower for both smaller and larger values of J, as indicated by the graph of FIG. 14.

Effect of the Initial Center Position of the Wavelet Snake

Figure 15:
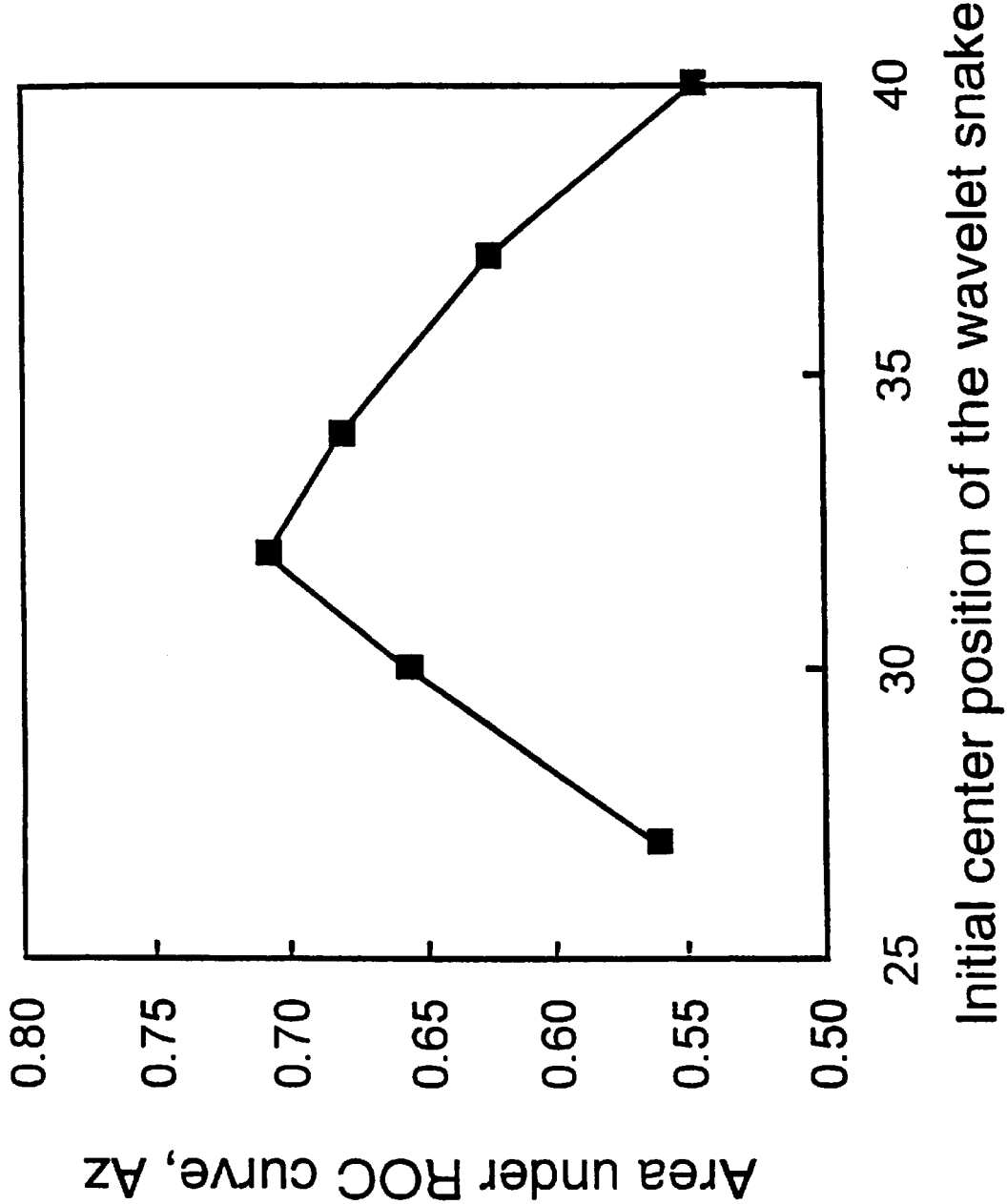
FIG. 15 is a graph of the overall performance of an exemplary feature characterization procedure according to the invention versus the initial center position of wavelet snakes with respect to an edge of an ROI.

FIG. 15 shows the effect of the initial center position (x,y) of a wavelet snake wherein the effect is varied by moving the center position along a diagonal line. In this example, the horizontal axis represents the pixel position for both x and y coordinates. It is to be noted that the size of the ROIs in our database is 64×64 pixels. $A_z$ reached the highest value when the center position was (32,32), corresponding to the center point of each ROI. The $A_z$ value was lower when the initial center position was shifted in either direction along the diagonal line, because some edges of the boundaries of nodules tended to cross the initial snake and, therefore, could not be fitted by the snake. Furthermore, some of multiscale edges that crossed the initial snake (and, consequently, could not be fitted by the snake) when the center position was (32,32) might have been apart from the initial snake when the center position was shifted. If this happened for a false positive, the edges might be fitted by the snake and yield a high degree of overlap for the false positive.

Each ROI in the database was obtained from an existing CAD system by first selecting a nodule candidate region from a difference image and then extracting the ROI from the original image, using the brightest point in the region as the center of the ROI. The high $A_z$ value obtained by setting the center of each ROI as the initial center position of the snake indicates that the existing CAD system correctly selected the centers of nodules in our database.

Figure 16:
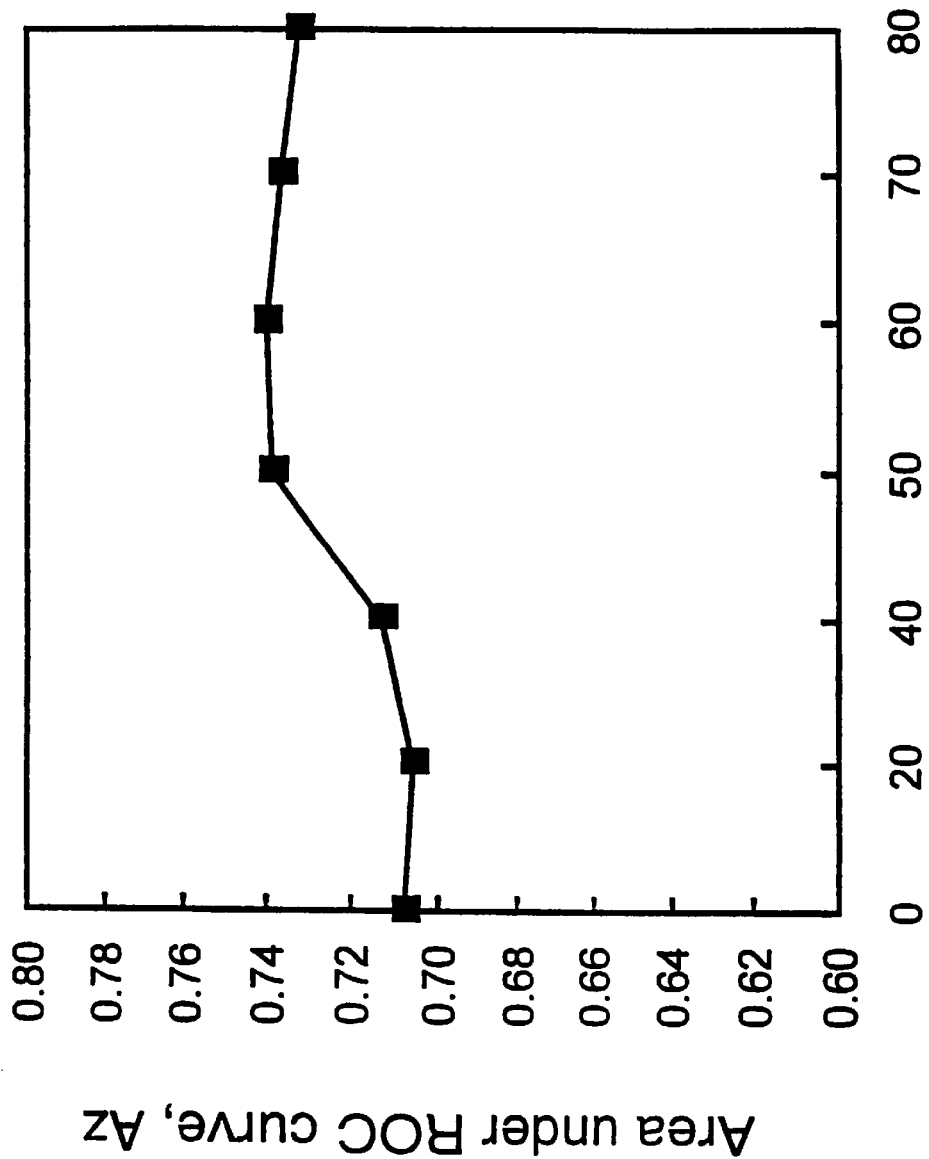
FIG. 16 is a graph of the overall performance of an exemplary feature characterization procedure according to the invention versus threshold value of multiscale edge representation.

Effect of the Combination Threshold Value of the Multiscale Edge Representation As described earlier, a combination threshold value can affect the degrees of overlap assigned to individual ROIs. FIG. 16 shows the effect of the combination threshold value on the overall classification performance. $A_z$ reached the highest value of 0.74 when the combination threshold value was 60. This result shows that the boundaries of the nodules with $D_3 \leq 60$ tended to be extracted more effectively at scale 4, whereas most of the boundaries of the nodules with $D_3 > 60$ were adequately extracted at scale 3. However, we observed that only a few false positives with $D_3 < 60$ had a larger degree of overlap at scale 4, which contributed to the high $A_z$ values seen in the graph of FIG. 16. The histogram and the corresponding ROC curve obtained at the highest $A_z$ value are shown in FIGS. 7(*a*) and 7(*b*), respectively.

Discussion

A major obstacle for obtaining high performance in computerized detection of pulmonary nodules is related to the problem of how to reduce the false-positive detection rate. Although several computerized methods for automated detection of nodules have been investigated, many of these methods suffer from a large number of false positives. [3] [4] [8] [20–25] For a clinically acceptable high sensitivity to be achieved with these previous methods, the number of false positives would increase to a value ranging from 5 to more than 10 per image. To overcome this difficulty, the invention provides several techniques for elimination of false positives in CAD procedures, including morphological feature analysis [3] [4], image feature analysis based on knowledge obtained from chest radiologists [26], morphological filters [5], nonlinear filtering techniques [27] ]28], and artificial neural networks [7] [8]. In analysis of posterior-anterior (PA) chest radiographs, the CAD procedure of the invention can, in some cases, achieve a sensitivity of 70% with approximately 2 false positives per image. [7]

The invention provides a computerized procedure for classification of pulmonary nodules based on an edge-guided wavelet snake model. The wavelet snake can be used for fitting of the boundary of the nodules, and the degree of overlap can be effectively used as a measure for classification of true nodules and false positives. The method of the invention is useful for reducing the number of false positives reported by CAD procedures, thereby improving the performance of CAD systems for detection of pulmonary nodules in digital chest radiographs.

In experimental testing of the present invention, the final outputs from an existing CAD system were used as a database for evaluation of performance. The 152 false positives in the database were, for conventional procedures, very difficult to distinguish from nodules, as evidenced by the fact that the false positives were not removed by the existing CAD procedure in spite of various methods for false-positive elimination employed by the existing CAD system. Nevertheless, although the false positives used in the test were difficult to distinguish from nodules, the exemplary procedure of the invention produced a good $A_z$ value in the classification of nodules and false positives. For example, as indicated by the histogram in FIG. 7(*a*), the procedure of the invention can eliminate 15% of false positives from among ROIs having degrees of overlap of at least 60, while sacrificing detection of only one true nodule. Therefore, the wavelet snake technique of the invention appears to be effective in the classification of nodules and false positives, even when difficult false positives (i.e., false positives which are not readily distinguished from true nodules) are included.

Obviously, numerous modifications and variations of the present invention are possible in light of the above teachings. It is therefore to be understood that within the scope of the appended claims, the invention may be practiced otherwise than as specifically described herein.

APPENDIX

[1] J. Forrest and P. Friedman. Radiologic errors in patients with lung cancer. West J Med, 134:485–490, 1981.

[2] D. Naidich, E. Zerhouni, and S. Siegelman. Computed Tomography of the Thorax, pages 171–172. New York, NY, Raven Press, 1984.

[3] M. L. Giger, K. Doi, and H. MacMahon. Image feature analysis and computer-aided diagnosis in digital radiography. 3. Automated detection of nodules in peripheral lung fields. Med Phys, 15:158–166, 1988.

[4] M. L. Giger, K. Doi, H. MacMahon, C. B. Metz, and F. Yin. Computer-aided detection of pulmonary nodules in digital chest images. RadioGraphics, 10:41–52, 1990.

[5] M. L. Giger, A. N, K. Doi, H. MacMahon, and C. E. Metz. Computerized detection of pulmonary nodules in digital chest images: Use of morphological filters in reducing false-positive detections. Med Phys, 17:861–865, 1990.

[6] T. Kobayashi, X.-W. Xu, H. MacMahon, C. E. Metz, and K. Doi. Effect of a computer-aided diagnosis scheme on radiologists' performance in detection of lung nodules on radiographs. Radiology, 199:843–848, 1996.

[7] X.-W. Xu, H. MacMahon, M. L. Giger, and K. Doi. Adaptive feature analysis of false positives for computerized detection of lung nodules in digital chest images. Proc SPIB:Medical Imaging 1997, 1997 (in print).

[8] X.-W. Xu, K. Doi, T. Kobayashi, H. MacMahon, and M. L. Giger. Development of an improved CAD scheme for automated detection of lung nodules in digital chest radiographs. Med Phys, 1996 (submitted).

[9] M. Kass, A. Witkin, and D. Terzopoulos. Snakes: Active contour models. International Journal of Computer Vision, 1(4):321–331, 1988.

[10] A. Witkin, D. Terzopoulos, and M. Kass. Signal matching through scale space. International Journal of Computer Vision, 1(2):133–144, 1987.

[11] M. Ayache, I. Cohen, and I. Herlin. Medical image tracking. In A. Blake and A. Y. eds., editors, Active Vision. Chap. 20. MIT Press, Cambridge, Mass., 1992.

[12] D. Geiger, A. Gupta, L. A. Costa, and J. Vlontzos. Dynamic programming for detecting, tracking, and matching deformable contours. IEEE Trans. on Pattern Anal. Machine Intell., 17(3):294–302, 1995.

[13] S. Lobregt and M. A. Viergever. A Discrete Dynamic Contour Model. IBBE Trans. on Pattern Anal. Machine Intell., 14(1):12–24, 1995.

[14] S. Mallat and W. L. Hwang. Singularity detection and processing with wavelets. IEEE Trans. Information Theory, 38:617–643, March 1992.

[15] S. Mallat and S. Zhong. Characterization of signals from multiscale edges. IEEE Trans. on Pattern Anal. Machine Intell., 14(7):710–732, July 1992.

[16] I. Daubechies. Ten Lectures on Wavelets. SIAM, Philadelphia, PA, 1992.

[17] Y. Amit. A non-linear variational problem for image matching. SIAM Journal on Scientific Computing, 15(1):207–224, 1994.

[18] U. Grenander and I. Miller. Representation of knowledge in complex systems. Journal of the Royal Statistical Society B., 56(3):549–603, 1994.

[19] C. B. Metz. Some practical issues of experimental design and data analysis in radiological ROC studies. Invest Radiol, 24:234–245, 1989.

[20] J. Toriwaki, Y. Suenaga, T. Negoro, and T. Fukumura. Pattern recognition of chest x-ray images. Compt Graph Image Process, 2:254–271, 1973.

[21] M. Hashimoto, P. Sanker, and J. Sklansky. Detecting the edges of lung tumors by classification techniques. Proc IEE Int Conf Patt Recogn, 1801:276–279, 1982.

[22] H. Suzuki and N. Inaoka. Computerized support of the detection of pulmonary nodules. In Proc Conference Image Technology, pages 145–148, 1985.

-continued

APPENDIX

[23] W. Lampeter and J. Wandtke. Computerized search of chest radiographs for nodules. Invest Radiol, 21:384–390, 1986.
[24] T. Matsumoto, H. Yoshimura, M. L. Giger, K. Doi, H. MacMahon, S. Montner, and T. Nakanishi. Potential usefulness of computerized nodule detection in screening programs for lung cancer: A pilot study. Invest Radiol, 27:471–475, 1992.
[25] S. Lo, M. Freedman, J. Lin, and S. Mun. Automatic lung nodule detection using profile matching and back-propagation neural network techniques. J. of Digital Imaging, 6:48–54, 1993.
[26] T. Matsumoto, H. Yoshimura, K. Doi, M. L. Giger, A. Kano, H. MacMahon, K. Abe, and S. Montner. Image feature analysis of false positive diagnoses produced by automated detection of lung nodules. Invest Radiol, 27:587–597, 1992.
[27] H. Yoshimura, M. L. Giger, T. Matsumoto, K. Doi, H. MacMahon, and S. Montner. Investigation of new filtering schemes for computerized detection of lung nodules. Proc SPIE, 1445:47–51, 1991.
[28] H. Yoshimura, M. L. Giger, K. Doi, H. MacMahon, and S. Montner. Computerized scheme for the detection of pulmonary nodules: Nonlinear filtering technique. Invest Radiol, 27:124–129, 1992.

What is claimed as new and desired to be secured by Letters Patent of the United States:

1. A method for classifying a selected feature in an original image, comprising:
    a) detecting at least one edge of said selected feature to make an initial determination of at least one portion of a boundary of said selected feature;
    b) providing a deformable contour in relation to said selected feature, the deformable contour being different from the detected at least one edge;
    c) overlapping the detected at least one edge with the deformable contour by deforming the deformable contour in relation to the detected at least one edge, to obtain a deformed contour approximating the boundary of said selected feature;
    d) determining a quality of matching in relation to a degree of overlap, resulting from step c), between the deformed deformable contour and the detected at least one edge; and
    e) classifying said selected feature into at least one category based on the quality of matching determined in step d).

2. A method according to claim 1, comprising:
    iteratively repeating steps c) and d) until said step d) indicates no further improvement in said quality of matching, whereupon said step e) of classifying is based on a maximum quality of matching determined in step d).

3. A method as recited in claim 2, wherein said step d) of determining comprises:
    calculating a cost function to measure said quality of matching, wherein said cost function has one of a minimum and a maximum under a condition in which an amount of overlap between said deformable contour and said at least one edge is maximized.

4. A method as recited in claim 3, wherein said step e) of classifying comprises:
    identifying said selected feature as one of a true nodule and a false positive, depending upon whether a value of said cost function is above a cost function threshold value.

5. A method as recited in claim 4, wherein said step a) of detecting comprises:
    providing a wavelet filter having a filter scale; and
    filtering said original image using said wavelet filter to thereby accentuate said selected feature.

6. A method as recited in claim 5, wherein said step b) of providing a deformable contour comprises providing a closed wavelet snake.

7. A method as recited in claim 6, wherein said step c) of deforming comprises:
    utilizing a wavelet transform to calculate a shape of said deformable contour.

8. A method as recited in claim 4, wherein said step b) of providing a deformable contour comprises providing a closed wavelet snake.

9. A method as recited in claim 8, wherein said step c) of deforming comprises:
    utilizing a wavelet transform to calculate a shape of said deformable contour.

10. A method as recited in claim 3, wherein said step a) of detecting comprises:
    providing a wavelet filter having a filter scale; and
    filtering said original image using said wavelet filter to thereby accentuate said selected feature.

11. A method as recited in claim 10, wherein said step b) of providing a deformable contour comprises providing a closed wavelet snake.

12. A method as recited in claim 11, wherein said step c) of deforming comprises:
    utilizing a wavelet transform to calculate a shape of said deformable contour.

13. A method as recited in claim 3, wherein said step b) of providing a deformable contour comprises providing a closed wavelet snake.

14. A method as recited in claim 13, wherein said step c) of deforming comprises:
    utilizing a wavelet transform to calculate a shape of said deformable contour.

15. A method as recited in claim 3, wherein said step e) of classifying comprises:
    identifying said selected feature as one of a true nodule and a false positive, depending upon whether a value of said cost function is above a cost function threshold value.

16. A method as recited in claim 2, wherein said step a) of detecting comprises:
    providing a wavelet filter having a filter scale; and
    filtering said original image using said wavelet filter to thereby accentuate said selected feature.

17. A method as recited in claim 16, wherein said step b) of providing a deformable contour comprises providing a closed wavelet snake.

18. A method as recited in claim 17, wherein said step c) of deforming comprises:
    utilizing a wavelet transform to calculate a shape of said deformable contour.

19. A method as recited in claim 2, wherein said step b) of providing a deformable contour comprises providing a closed wavelet snake.

20. A method as recited in claim 19, wherein said step c) of deforming comprises:
    utilizing a wavelet transform to calculate a shape of said deformable contour.

21. A method as recited in claim 2, wherein said step e) of classifying comprises:
    identifying said selected feature as one of a true nodule and a false positive.

22. A method as recited in claim 1, wherein said step d) of determining comprises:
    calculating a cost function to measure said quality of matching, wherein said cost function has one of a minimum and a maximum under a condition in which an amount of overlap between said deformable contour and said at least one edge is maximized.

23. A method as recited in claim 22, wherein said step e) of classifying comprises:

identifying said selected feature as one of a true nodule and a false positive, depending upon whether a value of said cost function is above a cost function threshold value.

24. A method as recited in claim 22, wherein said step e) of classifying comprises:

identifying said selected feature as one of a true nodule and a false positive, depending upon whether a value of said cost function is above a cost function threshold value.

25. A method as recited in claim 1, wherein said step a) of detecting comprises:

providing a wavelet filter having a filter scale; and filtering said original image using said wavelet filter thereby to accentuate said selected feature.

26. A method as recited in claim 1, wherein said step b) of providing a deformable contour comprises providing a closed wavelet snake.

27. A method as recited in claim 26, wherein said step c) of deforming comprises:

utilizing a wavelet transform to calculate a shape of said deformable contour.

28. A method as recited claim 26, wherein said step c) of deforming comprises:

constraining a smoothness of said snake according to at least one of a minimum smoothness limit and a maximum smoothness limit.

29. A method as recited in claim 1, wherein said step e) of classifying comprises:

identifying said selected feature as one of a true nodule and a false positive.

30. A method as recited in claim 1, wherein said step a) of detecting comprises:

providing a first wavelet filter having a first filter scale; and filtering said original image using said first wavelet filter thereby to produce a first filtered image in which said selected feature is accentuated.

31. A method as recited in claim 30, wherein said step a) further comprises:

providing a second wavelet filter having a second filter scale;

filtering said original image using said second wavelet filter thereby to produce a second filtered image in which said selected feature is accentuated.

32. A method as recited in claim 31, wherein said steps c) and d) of deforming comprises:

providing a first deformable contour and iteratively deforming said first deformable contour until the quality of matching between said first deformable contour and said first filtered image ceases to improve in order to determine a first maximum quality of matching;

providing a second deformable contour and iteratively deforming said second deformable contour until the quality of matching between said second deformable contour and said second filtered image ceases to improve in order to determine a second maximum quality of matching; and comparing said first maximum quality of matching to said second maximum quality of matching and selecting one of said first maximum quality of matching and said second maximum quality of matching for classification in step e).

33. A method as recited claim 1, wherein said step c) of deforming comprises:

constraining a smoothness of said deformable contour according to at least one of a minimum smoothness limit and a maximum smoothness limit.

34. A method as recited claim 1, wherein step a) comprises:

using a multiscale edge representation of a nodule to extract portions of the boundary of the nodule.

35. The method as recited in claim 34, wherein said step of using a multiscale edge representation comprises:

detecting edges of a nodule by constructing curved line segments from a filtered gradient image, including, selecting a set of local brightness maxima along a plurality of trajectories across the gradient image and selecting a set of initial edge points based on the local brightness maxima, linking adjacent edge points to form a set of curved line segments, each having a particular number of points and a particular value of average brightness, and selecting the line segments, within a predetermined range of a number of points and a predetermined range of average brightness, as a set of edge segments which approximate a border of a feature such as a nodule.

36. The method as recited in claim 35, wherein:

said step b) comprises using the detected edges to estimate the entire boundary of the nodule; and said step c) comprises using a wavelet transform for modification of the shape of the deformable contour.

37. The method as recited in claim 36, wherein:

said step b) of providing a deformable contour comprises providing a closed wavelet snake; and said step c) further comprises obtaining a smooth snake at each stage of deformation of said snake by restricting the range of the scales of the wavelet coefficients that define the shape of the wavelet snake.

38. The method as recited in claim 37, wherein said step e) comprises:

determining a degree of overlap between the snake and the multi scale edges; and using the determined degree of overlap between the snake and the multiscale edges as a measure for classification of nodules and false positives.

39. An image processing apparatus configured to perform the steps recited in one of claims 1, 2, 22, 3, 23, 4, 25, 5, 19, 17, 27, 20, 29, 15, 33 or 37.

40. A storage medium storing a program for performing the steps recited in one of claims 1, 2, 22, 3, 23, 4, 25, 5, 19, 17, 27, 20, 29, 15, 33 or 37.

* * * * *

UNITED STATES PATENT AND TRADEMARK OFFICE
CERTIFICATE OF CORRECTION

PATENT NO.    : 6,078,680                                  Page 1 of 1
DATED         : June 20, 2000
INVENTOR(S)   : Hiroyuki Yoshida et al It is certified that error appears in the above-identified patent and that said Letters Patent is hereby corrected as shown below:

Column 1,
Line 12, change "MRH DAMD 71-96-I-6228" to -- MRH DAMD 17-96-I-6228 --.

Signed and Sealed this

Sixth Day of November, 2001

Attest:

NICHOLAS P. GODICI
Attesting Officer   Acting Director of the United States Patent and Trademark Office